(12) United States Patent
Asao et al.

(10) Patent No.: US 6,717,316 B2
(45) Date of Patent: *Apr. 6, 2004

(54) ALTERNATOR AND METHOD OF MANUFACTURE THEREFOR

(75) Inventors: Yoshihito Asao, Tokyo (JP); Katsumi Adachi, Tokyo (JP); Akira Morishita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/978,548

(22) Filed: Oct. 18, 2001

(65) Prior Publication Data

US 2002/0047486 A1 Apr. 25, 2002

Related U.S. Application Data

(62) Division of application No. 09/624,222, filed on Jul. 24, 2000.

(30) Foreign Application Priority Data

Dec. 27, 1999 (JP) .............................. 11-377168

(51) Int. Cl.$^7$ ................................. H02K 3/00
(52) U.S. Cl. ........................... 310/179; 29/596; 29/597; 29/598
(58) Field of Search ................ 310/254, 179, 310/180, 184, 263, 216, 217; 29/596–598

(56) References Cited

U.S. PATENT DOCUMENTS

| | | | |
|---|---|---|---|
| 4,102,040 A | | 7/1978 | Rich |
| 4,876,473 A | * | 10/1989 | Tanaka et al. ............... 310/216 |
| 5,986,375 A | | 11/1999 | Umeda et al. |
| 5,994,813 A | | 11/1999 | Umeda et al. |

FOREIGN PATENT DOCUMENTS

| | | | |
|---|---|---|---|
| DE | 19633399 A1 | | 2/1998 |
| DE | 199 22 794 A1 | * | 11/1999 |
| EP | 0 881 742 A2 | | 12/1998 |
| EP | 0961386 A1 | | 12/1999 |
| EP | 0 881 742 A3 | | 5/2000 |
| JP | 10-48009201 | | 2/1973 |
| JP | 49-025404 | | 3/1974 |
| JP | 60016164 A | | 1/1985 |
| JP | 61273153 A | | 12/1986 |
| JP | 63194543 A | | 8/1988 |
| JP | 64-60240 | | 3/1989 |
| JP | 64-81645 | | 3/1989 |
| JP | 1-157250 | | 6/1989 |
| JP | 8-140318 | | 5/1996 |
| JP | 8-298756 | | 11/1996 |
| JP | 09-10302 | | 4/1997 |
| JP | 09 103 052 | * | 4/1997 |
| JP | 10-285882 | | 10/1998 |
| JP | 11018378 A | | 1/1999 |
| JP | 11069685 A | | 3/1999 |
| JP | 11-98722 | | 4/1999 |
| JP | 11-98782 | | 4/1999 |
| JP | 11155270 | | 6/1999 |
| JP | 11164505 A | | 6/1999 |
| JP | 11-187599 | | 7/1999 |
| JP | 2000-125512 | | 4/2000 |

* cited by examiner

*Primary Examiner*—Tran Nguyen
(74) *Attorney, Agent, or Firm*—Sughrue Mion, PLLC

(57) ABSTRACT

An alternator includes a rotor and a stator having a stator core surrounding the rotor, and a polyphase stator winding installed in the stator core, the stator core being provided with an abutting portion extending axially making the stator core into an annular shape by abutting end portions of the stator core, the polyphase stator winding comprising a number of winding portions in which long strands of wire are wound so as to alternately occupy an inner layer and an outer layer in a slot depth direction within slots at intervals of a predetermined number of slots, the strands of wire folding back outside the slots at axial end surfaces of the stator core, and an insulating member being interposed between the stator core and straight portions of the strands of wire in the winding.

9 Claims, 25 Drawing Sheets

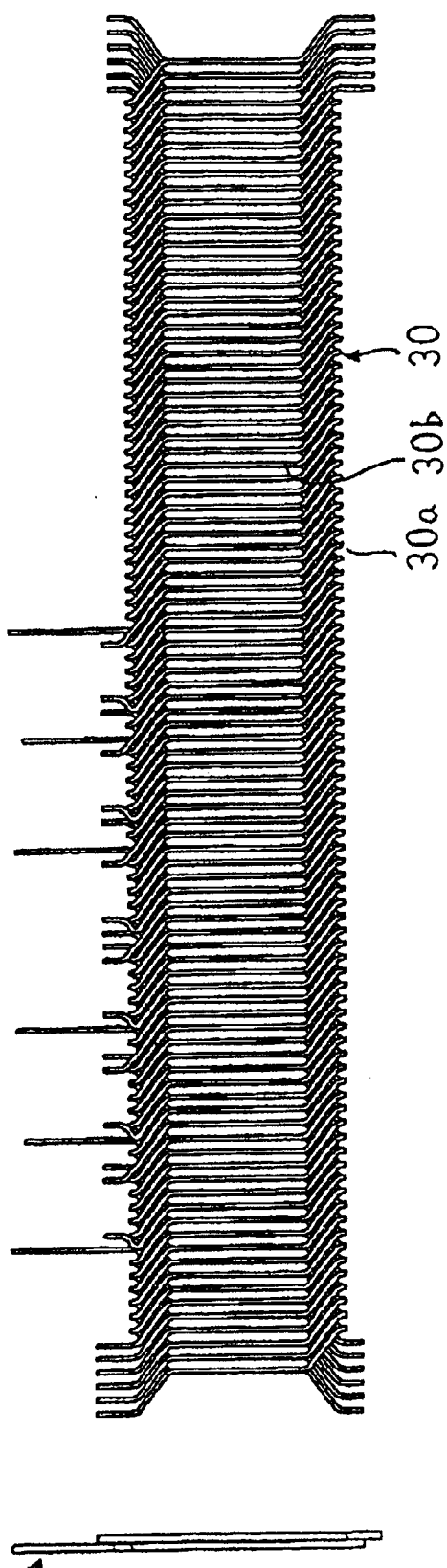

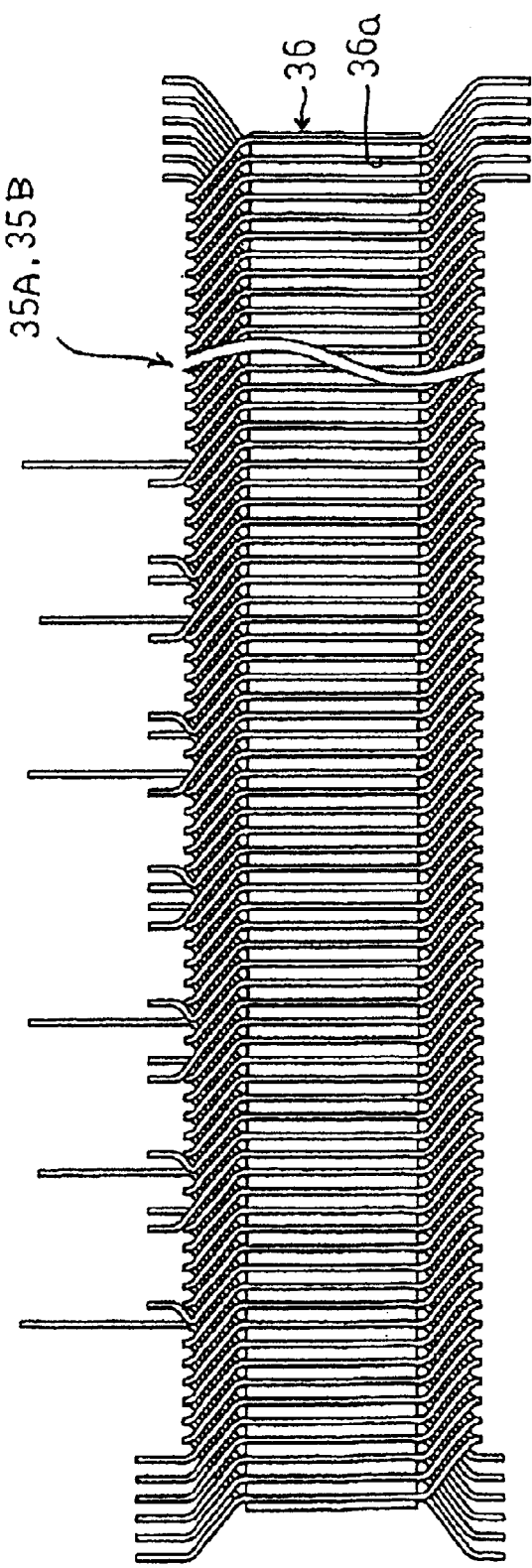

FIG. 21
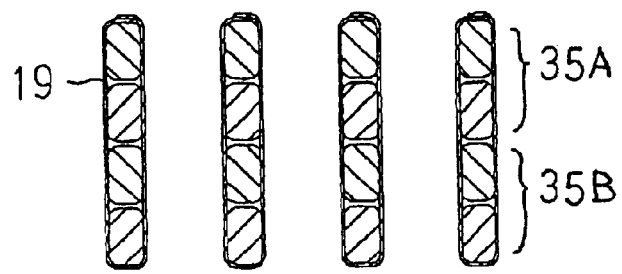
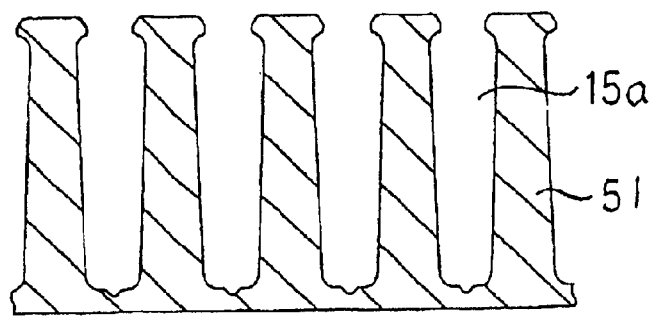
FIG. 22
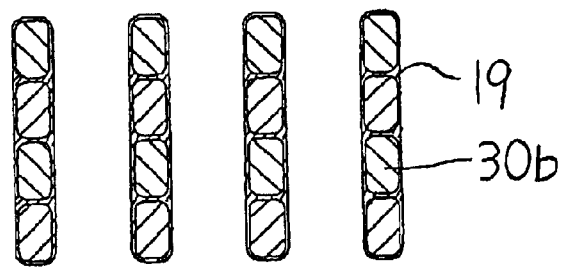
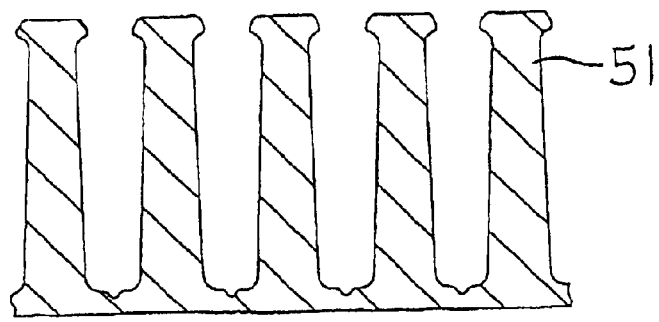

ALTERNATOR AND METHOD OF MANUFACTURE THEREFOR

This is a Divisional of application No. 09/624,222 filed Jul. 24, 2000, the disclosure of which is incorporated herein by reference.

BACKGROUND OF THE INVENTION

1. Field of the Invention

The present invention relates to an alternator driven by an internal combustion engine mounted to an automotive vehicle such as a passenger car or a truck, for example, and to a method for manufacturing the alternator.

2. Description of the Related Art

FIG. 29 is a perspective of a stator of a conventional automotive alternator such as described in Japanese Patent No. 2927288, for example, FIG. 30 is a perspective showing a conductor segment used in the stator in FIG. 29, and FIGS. 31 and 32 are perspectives from a front end and a rear end, respectively, of part of the stator in FIG. 29.

This stator 300 includes: a stator core 301; a stator winding 302 wound onto the stator core 301; and insulating members 304 mounted inside slots 303, the insulating members 304 electrically insulating the stator winding 302 from the stator core 301. The stator core 301 is a cylindrical laminated core laminated by stacking thin steel plates which are plate-shaped magnetic members, and has a number of slots 303 extending axially disposed at even pitch circumferentially so as to be open on an inner circumferential side. The stator winding 302 is constructed by joining a number of short conductor segments 305 in a predetermined winding pattern.

In the stator 300 of an automotive alternator having the above construction, because the stator winding 302 is constructed by inserting short conductor segments 305 formed in the general U shape into the slots 303 of the stator core 301 from the rear end and joining end portions 305b of the conductor segments 305 extending outwards at the front end, the coil end groups are composed of a large number of joint portions, allowing short-circuiting accidents to occur easily because the joint portions easily short-circuit with each other.

A large number of the short conductor segments 305 must be inserted into the stator core 301 and their end portions must be joined by welding, soldering, etc., making operability significantly poor. Furthermore, the amount of each conductor segment 305 which is inserted into the slots 303 must be greater than the length of the stator core 301, facilitating damage to the insulation coatings and insulating paper and reducing the quality of the finished product. In addition, when joining the end portions, short-circuiting often occurs between the joint portions due to spilt solder or weld melt, making mass-producibility significantly poor.

In contrast to the conventional construction using conductor segments 305, Japanese Patent Laid-Open No. HEI 8-298756 discloses a stator construction consisting of a number of coil pieces formed by first winding a number of straight-angled conductors a number of times into a generally hexagonal shape and inserting the coil pieces into slots in semicircular divided core portions.

In this stator, the coil pieces are inserted into the slots of the semicircular divided core portions in order in a radially outward direction. In other words, first facing side portions of the hexagonal coil pieces are positioned in an inner circumferential layer which is a layer on the inner side of the slots, and second facing side portions are positioned in an outer circumferential layer which is a layer on the outer side a predetermined number of slots away.

In this stator, although the alignment of the coil ends extending outwards from the slots is good, when joining the divided core portions to each other, the first side portions of the coil pieces are already inserted into the slots of a first divided core portion but because it is necessary to perform the operation of inserting the coil pieces into the slots of a second divided core portion at the same time as the operation of connecting the divided core portions, a temporary holding jig or the like must be used to perform a complicated operation, making productivity significantly poor.

Furthermore, insulating members between the divided core portions and the coil pieces are not disclosed, but under these working conditions, the operation of inserting insulating members must be complicated.

Forming the stator core by joining a number of divided core portions has also been troublesome, and forming the radial dimensions, etc., of each of the divided core portions so as to be uniform has been difficult.

Japanese Patent Laid-Open No. HEI 9-103052 discloses a stator 400 in which winding groups formed in a straight shape are inserted into a straight-shaped base core in a slot depth direction and the base core is bent into a cylindrical shape in a later process in order to improve the space factor of the conductors in the slots. FIG. 33 is an overall perspective of the stator 400 manufactured by this method. Although, insertion of the winding groups is significantly improved, because the winding groups have straight bridging portions extending circumferentially between the slots 401, the alignment of coil ends 402 extending outwards from the slots 401 is significantly poor, leading to increased radial dimensions and short-circuiting between the conductors in the coil ends 402.

Furthermore, no disclosure is made concerning insulating members between the core and the winding, but since interference between the coil ends is great, deformation of the winding is great even inside the slots, and insulation between the core and the winding cannot be considered good.

In the conventional automotive alternator disclosed in Japanese Patent No. 2927288, problems have been that a large number of the short conductor segments 305 must be inserted into the stator core 301 and their end portions must be joined by welding, soldering, etc., making operations and insulation significantly poor, that insulation coatings and insulating paper have been easily damaged during insertion of the conductor segments 305 into the slots, and when joining the end portions, that short-circuiting often occurs between the joint portions due to spilt solder or weld melt, making mass-producibility significantly poor.

In the alternator of Japanese Patent Laid-Open No. HEI 8-298756, problems have been that forming the stator core by joining a number of divided core portions has been troublesome, requiring a complicated operation using a temporary holding jig, thereby making the assembly operation of the stator and the installation of the insulating members in the core poor.

In the automotive alternator disclosed in Japanese Patent Laid-Open No. HEI 9-103052, the alignment of coil ends 402 extending outwards from the slots 401 is significantly poor, leading to increased radial dimensions and short-circuiting between the conductors in the coil ends 402, and insulation between the core and the winding has been sparse even within the slots, leading to problems such as facilitation of the occurrence of short-circuiting, etc.

SUMMARY OF THE INVENTION

The present invention aims to solve the above problems and an object of the present invention is to provide an alternator significantly improving assembly and enabling insulation between the stator core and the winding to be improved, and to provide a method for manufacturing the alternator.

To this end, according to the present invention, there is provided an alternator comprising: a rotor for forming north-seeking (N) and south-seeking (S) poles alternately about a rotational circumference; and a stator comprising: a stator core surrounding the rotor; and a polyphase stator winding installed in the stator core, the stator core being formed with a number of slots extending axially at a predetermined pitch in a circumferential direction and being provided with an abutting portion extending axially, abutting portion making stator core into an annular shape by abutting end portions of the stator core, the polyphase stator winding comprising a number of winding portions in which long strands of wire are wound so as to alternately occupy an inner layer and an outer layer in a slot depth direction within the slots at intervals of a predetermined number of slots, the strands of wire folding back outside the slots at axial end surfaces of the stator core, and an insulating member being interposed between the stator core and the winding.

According to another aspect of the present invention, there is provided a method for manufacturing the alternator wherein the insulating member is first disposed on the winding before the winding is inserted into the slots of the stator core.

According to still another aspect of the present invention, there is provided a method for manufacturing the alternator wherein a base insulating member is first disposed between the slots and the winding; and insulating member is interposed between said stator core and the winding by inserting the winding into said slots.

BRIEF DESCRIPTION OF THE DRAWINGS

FIGS. 9 (a) and 9 (b) are an end elevation and a plan, respectively, showing an outer layer wire-strand group constituting part of the stator winding used in the automotive alternator in FIG. 1;

FIG. 18 is a plan showing a wire-strand group constituting part of the stator winding in FIG. 1 installed in the base core;

FIG. 21 is a cross section showing insertion of a winding into a base core in Embodiment 2;

FIG. 22 is a cross section showing insertion of a winding into a base core in Embodiment 3;

FIG. 23 (b) is an end elevation of FIG. 23 (a);

DETAILED DESCRIPTION OF THE PREFERRED EMBODIMENTS

Embodiment 1

Figure 1:
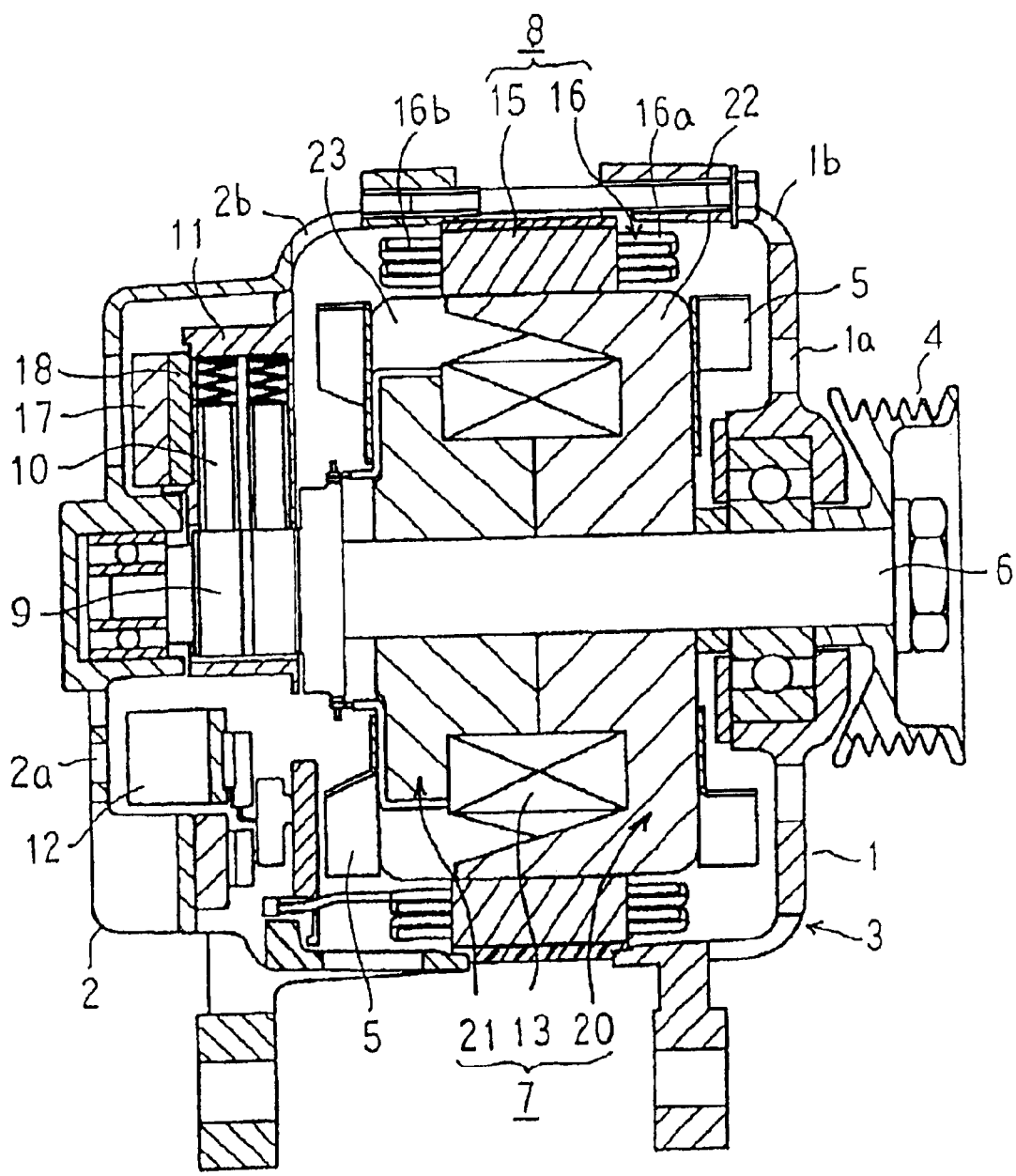
FIG. 1 is a cross section of an automotive alternator according to Embodiment 1 of the present invention.
Figure 2:
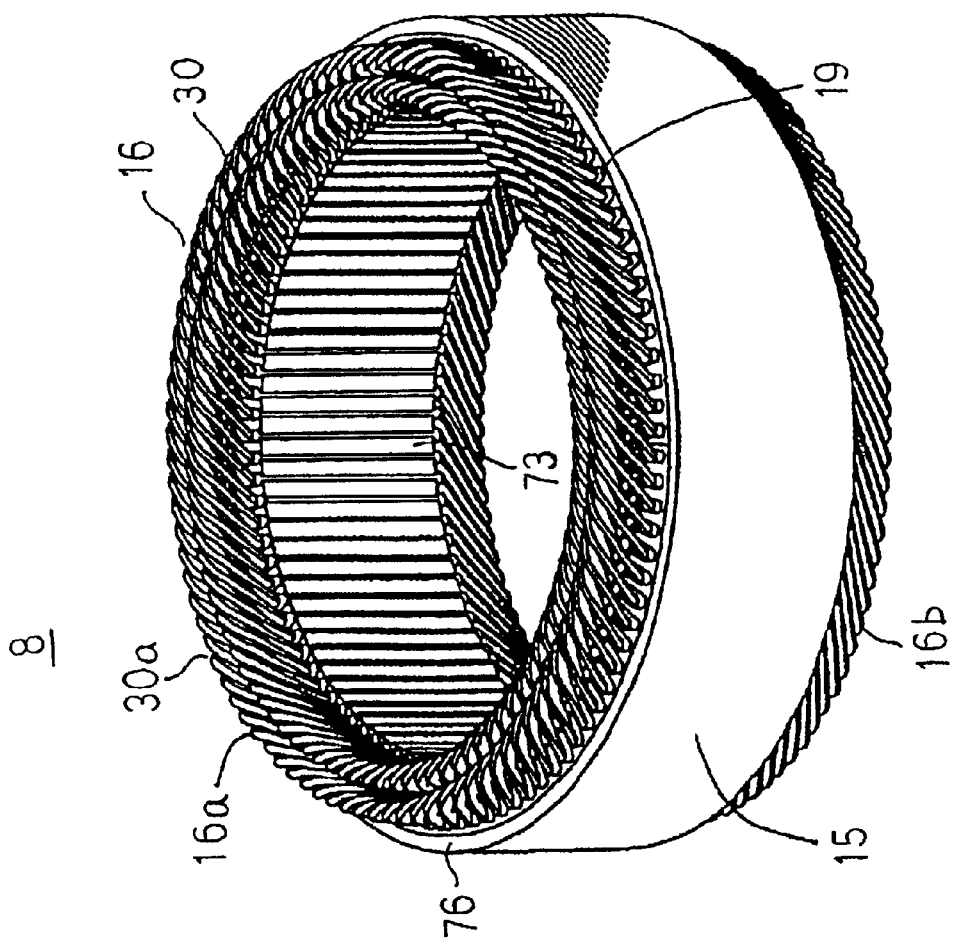
FIG. 2 is a perspective of a stator in FIG. 1.
Figure 3:
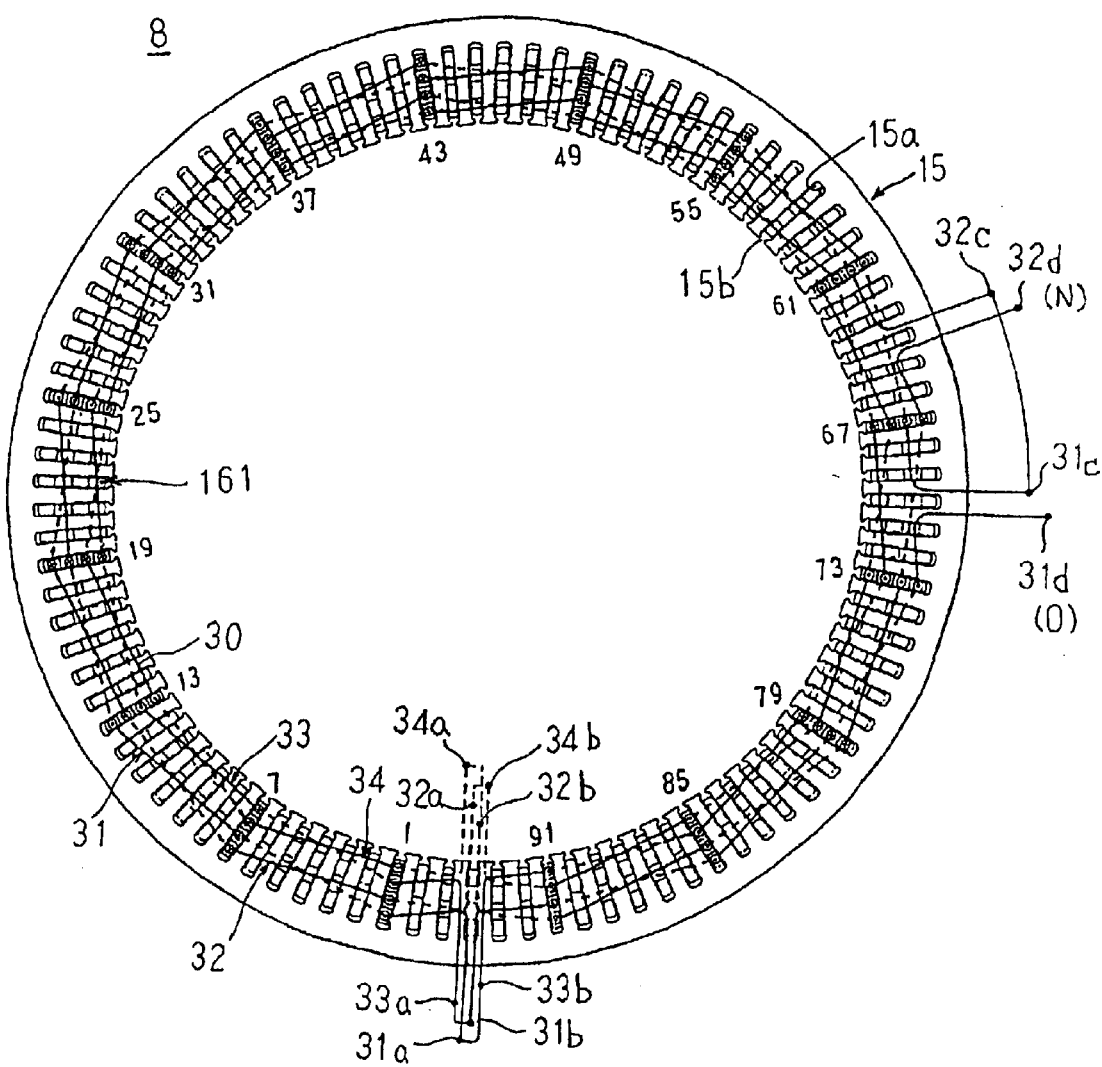
FIG. 3 is an end elevation explaining connections in one phase of stator winding group in FIG. 1.
Figure 4:
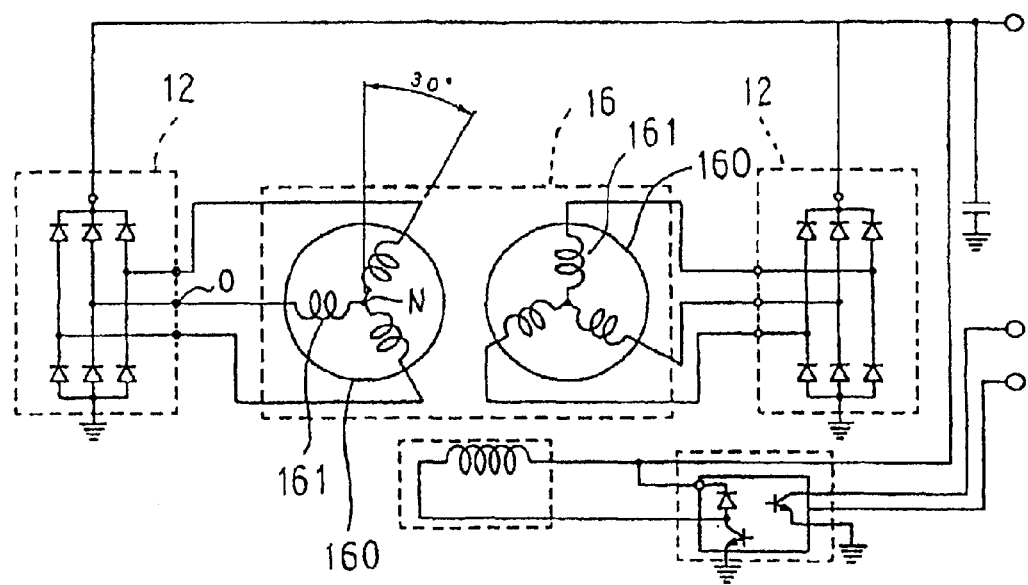
FIG. 4 is a circuit diagram for the automotive alternator in FIG. 1.
Figure 5:
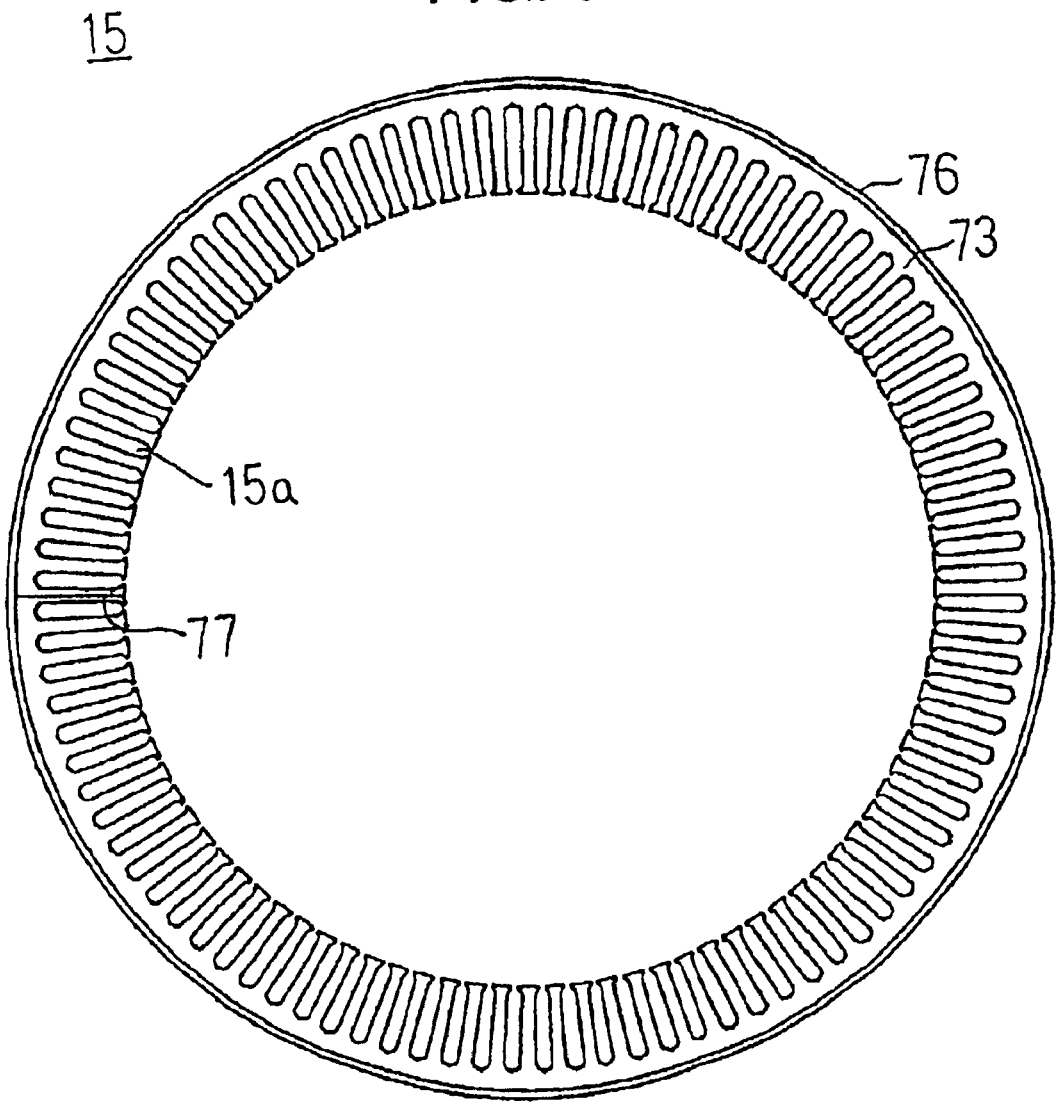
FIG. 5 is a cross section of a stator core in FIG. 1.

FIG. 1 is a cross section showing the construction of an automotive alternator according to Embodiment 1 of the present invention, FIG. 2 is a perspective of the stator of this automotive alternator, FIG. 3 is an end elevation explaining connections in one phase of stator winding group in this automotive alternator, FIG. 4 is a circuit diagram for this automotive alternator, and FIG. 5 is a partial cross section of the stator core in FIG. 1. Moreover, lead wires and bridging wires have been omitted from FIG. 2.

This alternator includes: a case 3 composed of an aluminum front bracket 1 and an aluminum rear bracket 2; a shaft 6 disposed within the case 3 having a pulley 4 secured to a first end thereof; a Lundell-type rotor 7 secured to the shaft 6; fans 5 secured to both axial end surfaces of the rotor 6; a stator 8 secured to an inner wall of the case 3; slip rings 9 secured to a second end of the shaft 6 for supplying electric current to the rotor 7; a pair of brushes 10 sliding on the slip rings 9; brush holders 11 accommodating the brushes 10; rectifiers 12 electrically connected to the stator 8 for converting alternating current generated in the stator 8 into direct current; a heat sink 17 fitted over the brush holder 11; and a regulator 18 fastened to the heat sink 17 by adhesive for adjusting the magnitude of the alternating voltage generated in the stator 8.

The rotor 7 includes a rotor coil 13 for generating magnetic flux on passage of electric current, and a pair of first and second pole cores 20 and 21 disposed so as to cover the rotor coil 13, magnetic poles being produced in the pair of pole cores 20 and 21 by the magnetic flux. The pair of pole cores 20 and 21 are made of iron and each has eight claw-shaped magnetic poles 22 and 23 secured to the shaft so as to be spaced at even pitch circumferentially around outer circumferential edges, facing each other so as to intermesh.

The stator 8 includes: a cylindrical stator core 15 composed of a laminated core formed with a number of slots 15a extending axially at a predetermined pitch in a circumferential direction; a polyphase stator winding 16 wound onto the stator core 15; and insulating members 19 installed in each of the slots 15a for electrically insulating the polyphase stator winding 16 from the stator core 15. The stator core 15 includes an inner circumferential core portion 73 and a cylindrical outer circumferential core portion 76 fitted over the inner circumferential core portion 73. A radial dimension of a core back of the inner circumferential core portion 73 is 2.6 mm, and a radial dimension of a core back of the outer circumferential core portion 76 is 1 mm. The polyphase stator winding 16 includes a number of windings in each of which one strand of wire 30 is bent back outside the slots 15a at end surfaces of the stator core 15 and wound into a wave winding so as to alternately occupy an inner layer and an outer layer in a slot depth direction within slots 15a a predetermined number of slots apart. In this case, the stator core 15 is formed with ninety-six slots 15a at even pitch so as to house two sets of three-phase stator winding portions 160 such that the number of slots housing each phase of the winding portions corresponds to the number of magnetic poles (sixteen) in the rotor 7. Long, insulated copper wire material having a rectangular cross section, for example, is used in the strands of wire 30.

Air intake vents 1a and 2a are formed in axial end surfaces of the front bracket 1 and the rear bracket 2, and air discharge vents 1b and 2b are disposed in two outer circumferential shoulder portions of the front bracket 1 and the rear bracket 2, opposite the radial outside of the front-end and rear-end coil ends 16a and 16b of the stator winding 16.

One phase of stator winding group 161 is composed of first to fourth winding sub-portions 31 to 34 each formed from one strand of wire 30. The first winding sub-portion 31 is formed by wave winding one strand of wire 30 into every sixth slot from slot numbers 1 to 91 so as to alternately occupy a first position from an outer circumferential side and a second position from the outer circumferential side inside the slots 15a. The second winding sub-portion 32 is formed by wave winding a strand of wire 30 into every sixth slot from slot numbers 1 to 91 so as to alternately occupy the second position from the outer circumferential side and the first position from the outer circumferential side inside the slots 15a. The third winding sub-portion 33 is formed by wave winding a strand of wire 30 into every sixth slot from slot numbers 1 to 91 so as to alternately occupy a third position from the outer circumferential side and a fourth position from the outer circumferential side inside the slots 15a. The fourth winding sub-portion 32 is formed by wave winding a strand of wire 30 into every sixth slot from slot numbers 1 to 91 so as to alternately occupy the fourth position from the outer circumferential side and the third position from the outer circumferential side inside the slots 15a. The strands of wire 30 are arranged to line up in a row of four strands within each slot 15a with the longitudinal direction of their rectangular cross sections aligned in a radial direction.

At a first end of the stator core 15, a first end portion 31a of the first winding sub-portion 31 extending outwards from slot number 1 and a second end portion 33b of the third winding sub-portion 33 extending outwards from slot number 91 are joined, and in addition, a first end portion 33a of the third winding sub-portion 33 extending outwards from slot number 1 and a second end portion 31b of the first winding sub-portion 31 extending outwards from slot number 91 are joined to form two turns of winding.

At a second end of the stator core 15, a first end portion 32a of the second winding sub-portion 32 extending outwards from slot number 1 and a second end portion 34b of the fourth winding sub-portion 34 extending outwards from slot number 91 are joined, and in addition, a first end portion 34a of the fourth winding sub-portion 34 extending outwards from slot number 1 and a second end portion 32b of the second winding sub-portion 32 extending outwards from slot number 91 are joined to form two turns of winding.

In addition, a portion of the strand of wire 30 of the second winding sub-portion 32 extending outwards at the first end of the stator core 15 from slot numbers 61 and 67 is cut, and a portion of the strand of wire 30 of the first winding sub-portion 31 extending outwards at the first end of the stator core 15 from slot numbers 67 and 73 is also cut. A first a end 31c of the first winding sub-portion 31 and a first cut end 32c of the second winding sub-portion 32 are joined to form one phase of stator winding group 161 having four turns connecting the first to fourth winding sub-portions 31 to 34 in series.

Moreover, the joint portion between the first cut end 31c of the first winding sub-portion 31 and the first cut end 32c of the second winding sub-portion 32 becomes a bridging connection connecting portion, and a second cut end 31d of the first winding sub-portion 31 and a second cut end 32d of the second winding sub-portion 32 become an lead wire (O) and a neutral-point lead wire (N), respectively.

A total of six phases of stator winding groups 161 are similarly formed by offsetting the slots 15a into which the strands of wire 30 are wound one slot at a time. Then, three phases each of the stator winding groups 161 are connected into star connections to form the two sets of three-phase stator winding portions 160, and each of the three-phase stator winding portions 160 is connected to its own rectifier 12. The rectifiers 12 are connected in parallel so that the direct-current output from each is combined.

In the automotive alternator constructed in this manner, electric current is supplied from a battery (not shown) through the brushes 10 and the slip rings 9 to the rotor coil 13, generating magnetic flux. The claw-shaped magnetic poles 22 of the first pole core 20 are magnetized with north-seeking (N) poles by this magnetic flux, and the claw-shaped magnetic poles 23 of the first pole core 21 are magnetized with south-seeking (S) poles. At the same time, rotational torque from the engine is transmitted through the belt and the pulley 4 to the shaft 6, rotating the rotor 7. Thus, a rotating magnetic field is applied to the polyphase stator winding 16, generating electromotive force in the polyphase stator winding 16. This alternating electromotive force passes through the rectifiers 12 and is converted into direct current, the magnitude of the current is adjusted by the regulator 18, and the battery is recharged.

At the rear end, external air is drawn in through the air intake vents 2a disposed opposite the heat sinks of the rectifiers 12 and the heat sink 17 of the regulator 18, respectively, by rotation of the fans 5, flowing along the axis of the shaft 6, cooling the rectifiers 12 and the regulator 18, and is then deflected centrifugally by the fans 5, cooling the rear-end coil end group 16b of the polyphase stator winding 16 before being expelled to the outside through the air discharge vents 2b. At the same time, at the front end, external air is drawn in axially through the air intake vents 1a by rotation of the fans 5, and is then deflected centrifugally by the fans 5, cooling the front-end coil end group 16a of the polyphase stator winding 16 before being expelled to the outside through the air discharge vents 1b.

Next, the method of manufacturing the stator of the above construction will be explained.

Figure 6:
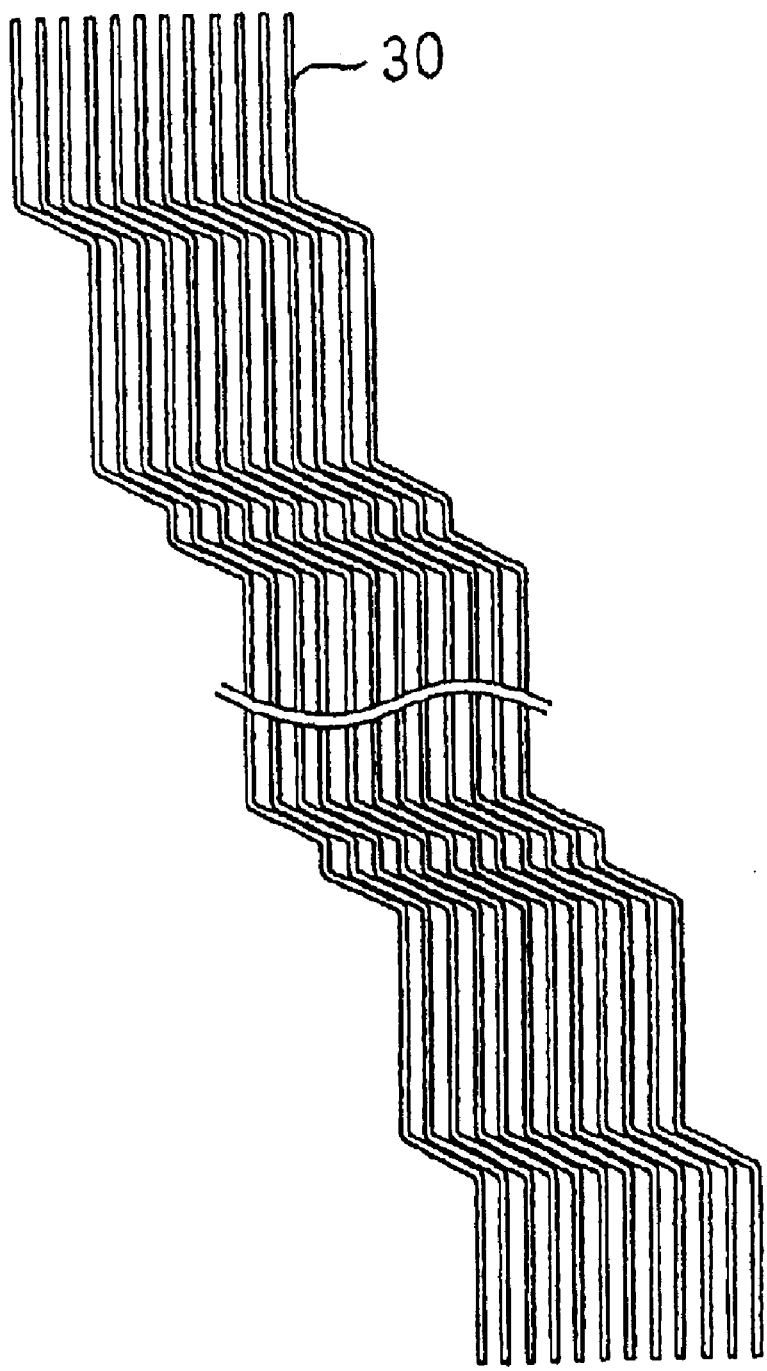
FIG. 6 is a diagram explaining the manufacturing process for winding groups constituting part of the stator winding used in the automotive alternator in FIG. 1.
Figure 7:
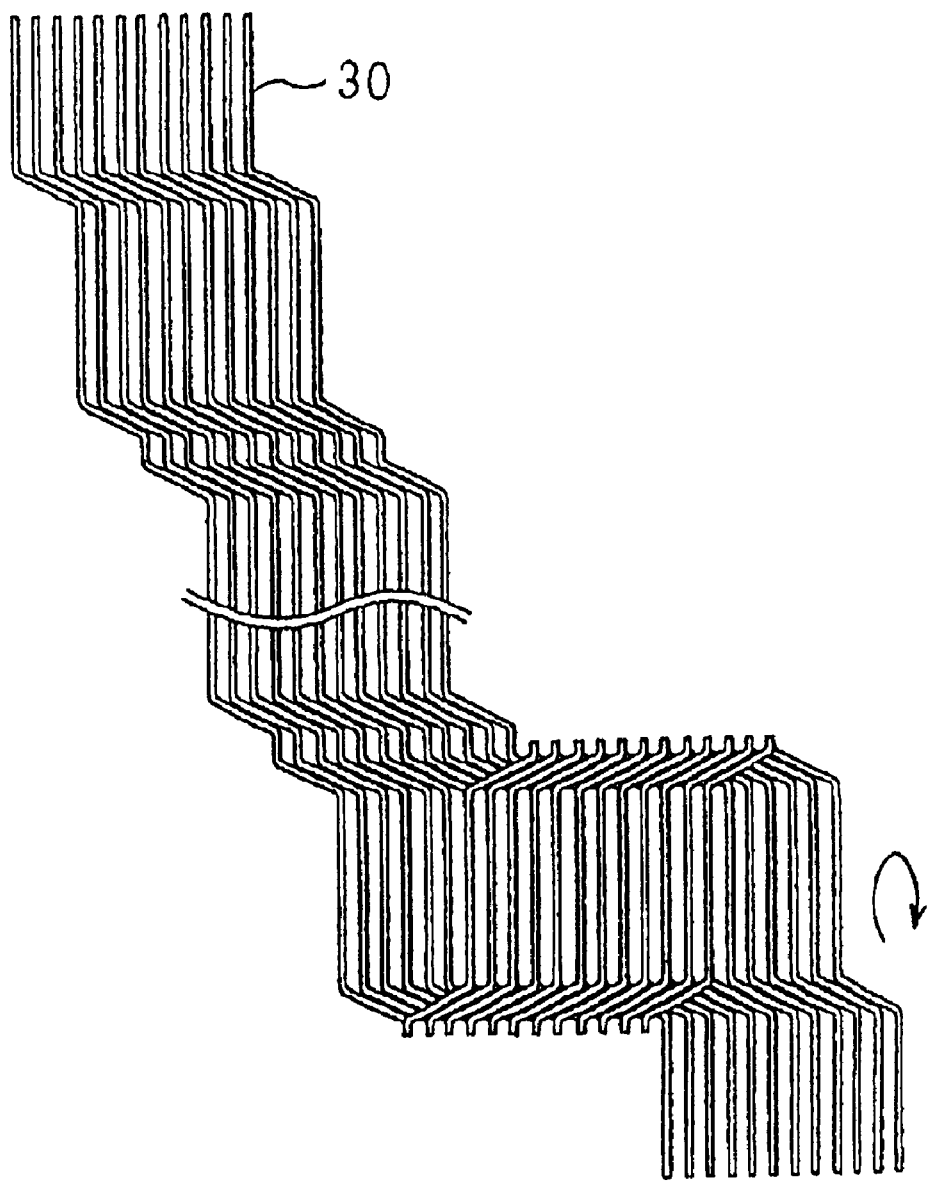
FIG. 7 is a diagram explaining the manufacturing process for winding groups constituting part of the stator winding used in the automotive alternator in FIG. 1.
Figures 8A, 8B:
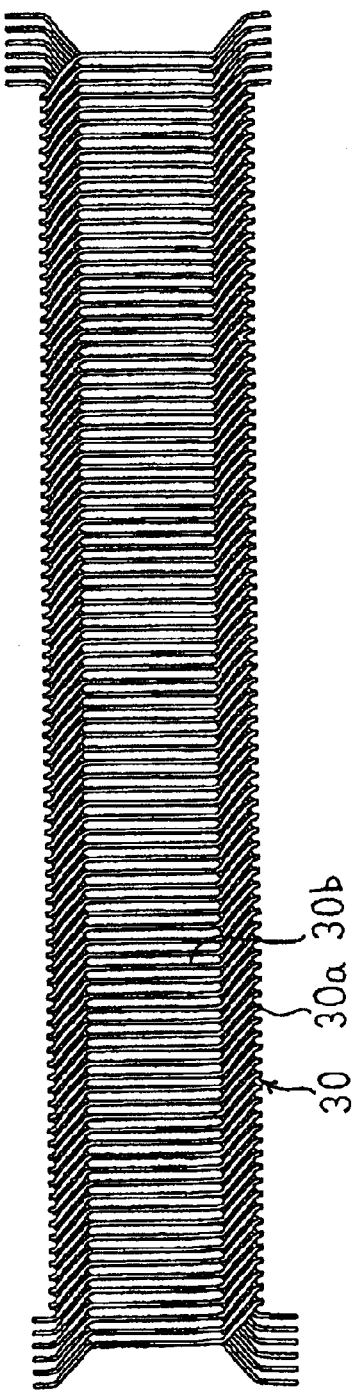
FIGS. 8 (a) and 8 (b) are an end elevation and a plan, respectively, showing an inner layer wire-strand group constituting part of the stator winding used in the automotive alternator in FIG. 1.
Figure 11:
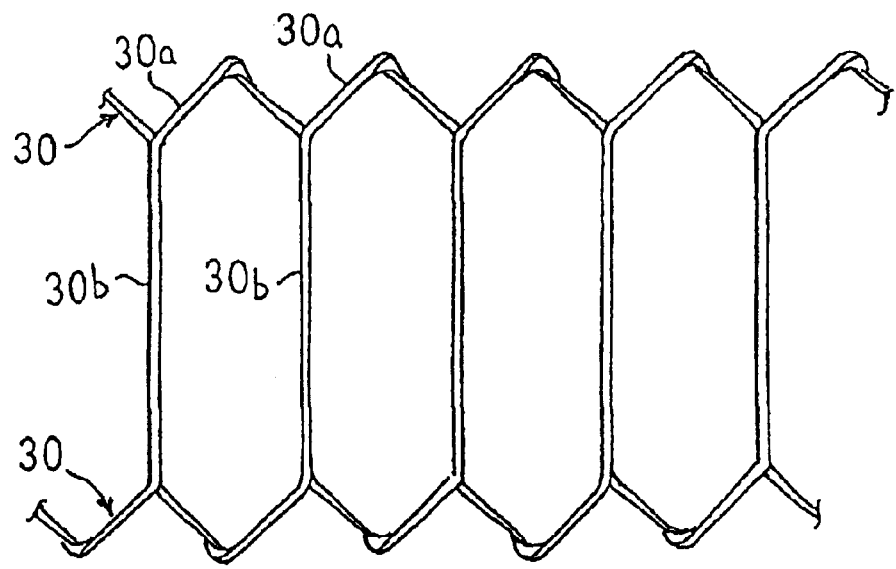
FIG. 11 is a diagram explaining arrangement of the strands of wire constituting part of the stator winding used in the automotive alternator in FIG. 1.
Figure 10:
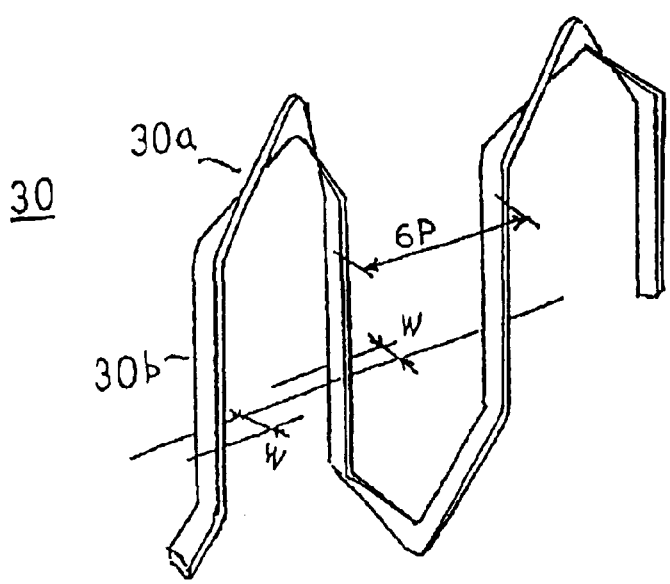
FIG. 10 is a perspective showing part of a strand of wire constituting part of the stator winding used in the automotive alternator in FIG. 1.

FIGS. 6 and 7 are diagrams explaining the manufacturing process for winding groups constituting part of the stator winding 16 in FIG. 2. FIGS. 8 (a) and 8 (b) are diagrams showing an inner layer wire-strand group constituting part of the stator winding 16 in FIG. 2, FIG. 8 (a) being an end elevation and FIG. 8 (b) being a plan. FIGS. 9 (a) and 9 (b) are diagrams showing an outer layer wire-strand group constituting part of the stator winding 16 in FIG. 2, FIG. 9 (a) being an end elevation and FIG. 9 (b) being a plan. FIG. 10 is a perspective showing part of a strand of wire constituting part of the stator winding 16 in FIG. 2, and FIG. 11 is a diagram explaining arrangement of the strands of wire constituting part of the stator winding 16 in FIG. 2.

First, as shown in FIG. 6, twelve long strands of wire 30 are simultaneously bent in the same plane to form a lightning-bolt shape. Then, a wire-strand group 35A, shown in FIGS. 8 (a) and 8 (b), is prepared by progressively folding the strand at right angles, as indicated by the arrow in FIG. 7, using a jig. In addition, a wire-strand group 35B including bridging connections and lead wires, as shown in FIGS. 9 (a) and 9 (b), is prepared similarly.

Moreover, as shown in FIG. 10, each strand of wire 30 is formed by bending it into a planar pattern in which straight portions 30b connected by turn portions 30a are lined up at a pitch of six slots (6P). Adjacent straight portions 30b are offset radially by a distance equal to one width (W) of the strands of wire 30 by means of the turn portions 30a. The wire-strand groups 35A and 35B are constructed by arranging six wire-strand pairs so as to be offset by a pitch of one slot from each other, each wire-strand pair consisting of two strands of wire 30 formed in the above pattern which are offset by a pitch of six slots and arranged such that straight portions 30b overlap as shown in FIG. 11. Six end portions of the strands of wire 30 each extend outwards from first and second sides at first and second ends of the wire-strand groups 35A and 35B. Furthermore, the turn portions 30a are arranged so as to line up in rows on first and second side portions of the wire-strand groups 35A and 35B. Since the hardness of the wire-strand groups 35A and 35B increases due to flexural hardening during shaping thereof, the wire-strand groups 35A and 35B are heat treated for ten minutes at 300° C. to facilitate shaping in later steps.

Figure 12:
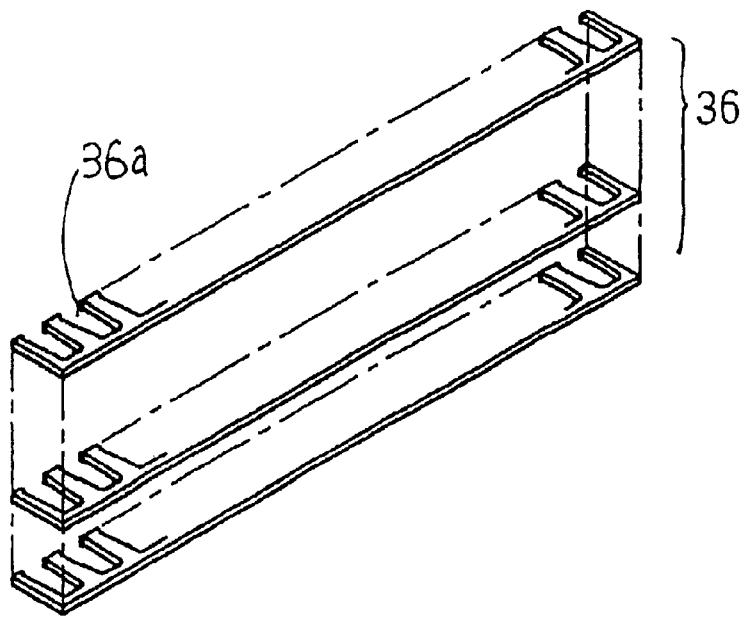
FIG. 12 is an exploded perspective of a base core.
Figure 13:
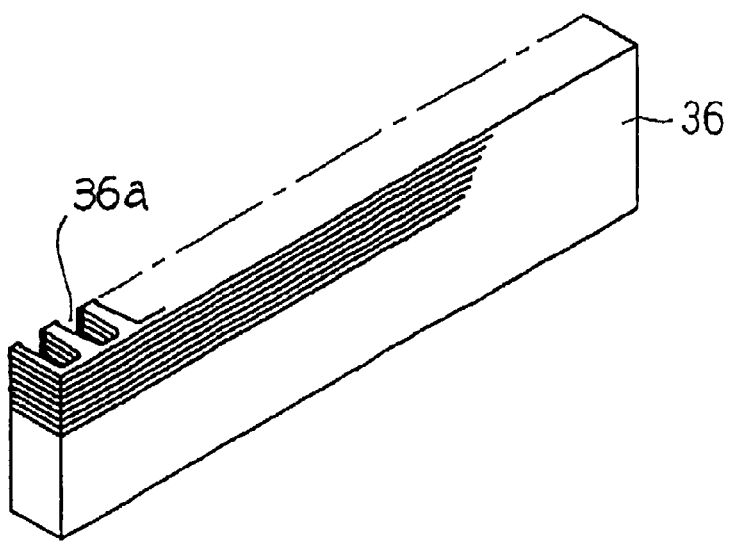
FIG. 13 is a perspective of the base core of the stator core in FIG. 1 before bending.
Figure 14:
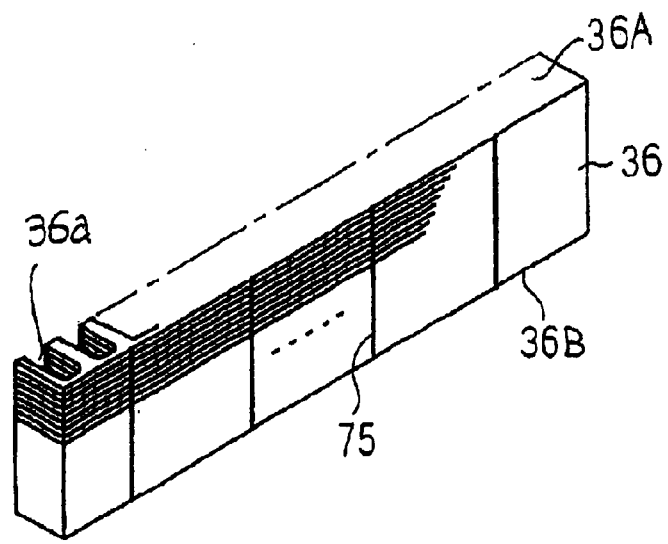
FIG. 14 is a diagram showing weld portions formed on the base core.
Figure 17:
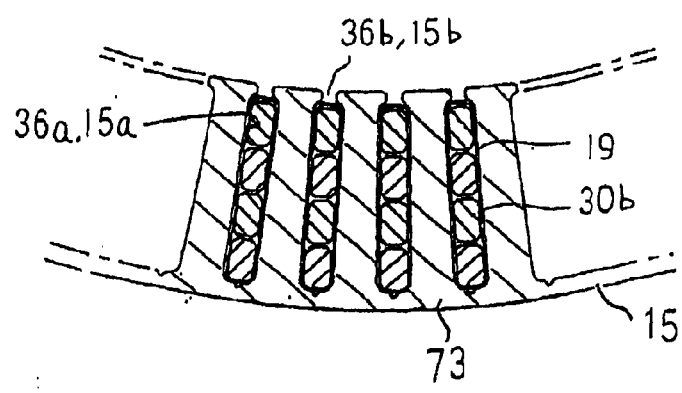
FIG. 17 is a partial enlargement of FIG. 16 (c)

The parallelepiped base core 36 is prepared as shown in FIGS. 12 to 14 by laminating a predetermined number of sheets of SPCC material, which is a plate-shaped magnetic material, formed with trapezoidal slots 36a at a predetermined pitch (an electrical angle of 30°) and laser welding an outer portion thereof. Moreover, both axial end surfaces 36A and 36B of the base core are easily buckled as a result of warping of the SPCC material during bending of the base core 36, but in this embodiment, the many layers of SPCC material are firmly integrated by weld portions 75 extending axially at a number of locations, increasing the rigidity of the base core 36 and suppressing buckling. Moreover, these weld portions 75 do not have to be evenly spaced, and they may also be divided in the axial direction.

Figure 15A:
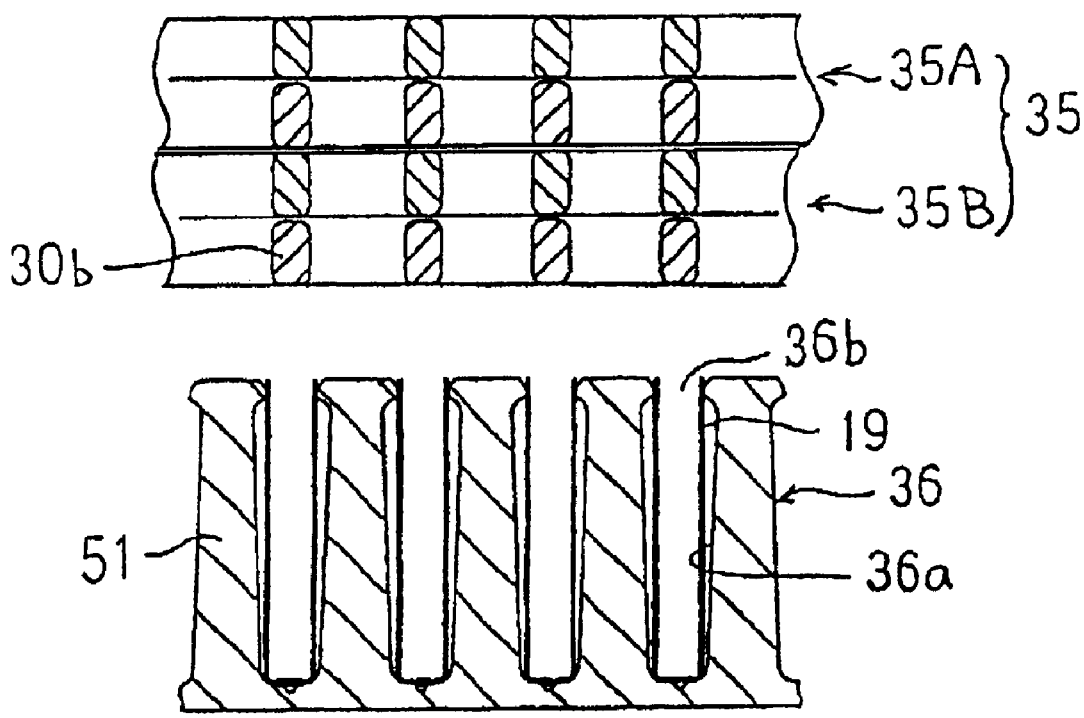
FIGS. 15 (a) and (b) are diagrams explaining steps of inserting the winding into the base core.
Figure 15B:
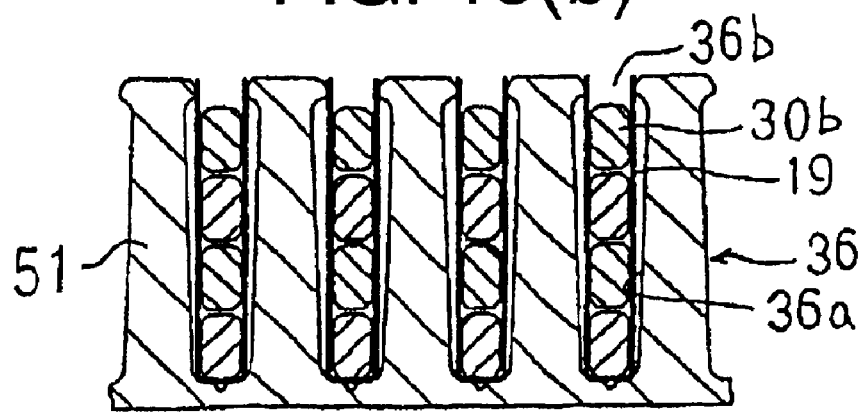

Then, with the insulating members 19 inserted into the slots 36a of the base core 36 as shown in FIG. 15 (a), the straight portions 30b of the two wire-strand groups 35A and 35B are inserted into the slots 36a (FIGS. 15 (b) and 18).

Figure 16A:
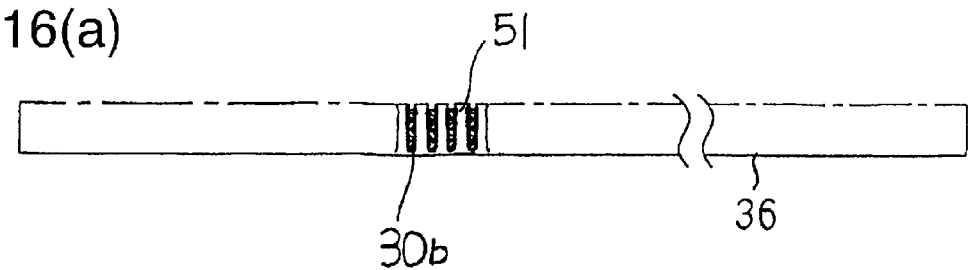
FIGS. 16 (a), (b), and (c) are diagrams explaining the process of bending the stator core in FIG. 1.
Figure 16B:
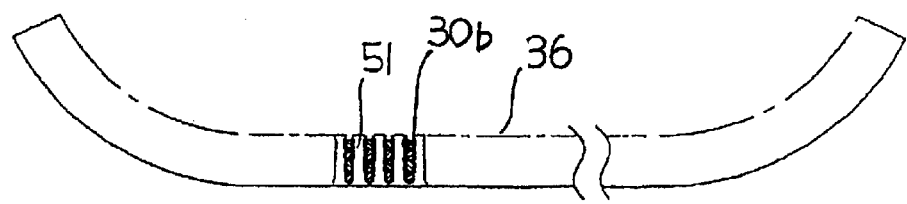
Figure 16C:
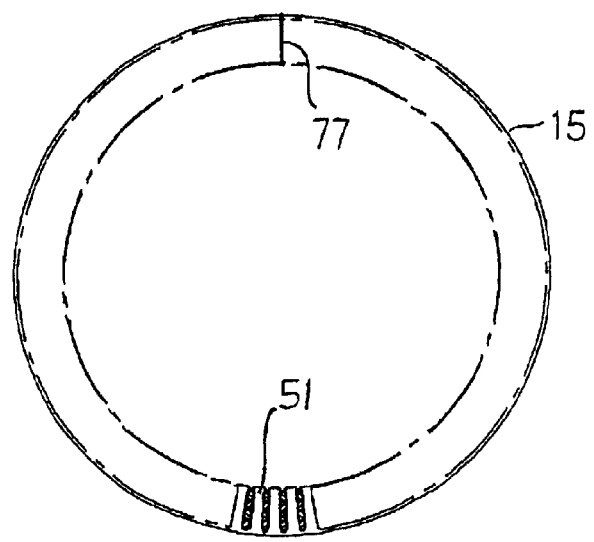

Next, as shown in FIGS. 16 (a), (b), and (c), the parallelepiped base core 36 with the wire-strand groups 35A and 35B inserted is rolled up into a cylindrical shape, and its ends abutted and welded to each other to form an abutting portion 77, and a cylindrical inner circumferential core portion 73 is obtained, as shown in FIG. 16 (c). As shown in FIGS. 15 (b) and 17, a width t2 of the opening portions 15b of the slots 15a of the inner circumferential core portion 73 is smaller than a width t1 of the opening portions of the slots 36a of the parallelepiped base core 36. Moreover, because the base core 36 is prepared by first bending the end portions thereof only before bending the rest of the parallelepiped base core 36, as shown in FIG. 16 (b), when the ends of the base core 36 are abutted, a stator core 15 is provided which has good roundness even at the abutting portion 77.

Since the slots 36a of the base core 36 are trapezoidal, widening towards the opening portions as shown in FIG. 15 (a), and the width of the opening portions is greater than the circumferential width dimensions of the straight portions 30b of the two wire-strand groups 35A and 35B, the straight portions 30b do not interfere with the tooth ends and can be inserted smoothly. Furthermore, because circumferential width dimensions of the slots 15a of the stator core 15 are generally the same as the circumferential dimensions of the straight portions 30b, the teeth 51 and straight portions 30b are prevented from pressing on and deforming each other during bending of the base core 36.

Because the insulating members 19, which are composed of polyamide-based insulating paper having a thickness of 140 μm, are first housed in the slots 36a before insertion of the winding and extend as far as the end portions of the teeth 51, damage to the strands of wire 30 due to contact between the straight portions 30b and the end portions of the teeth 51 is prevented, and the insulating members 19 also function as guides for the straight portions 30 as they enter the slots 36a, and the assembly of the stator 8 is improved in particular by the presence of the insulating paper because the winding slides on the insulating paper as it is inserted.

Even if the straight portions 30b are subjected to deformation from the teeth 51 when bending the base core 36, the force of the deformation is buffered by sliding, etc., because the insulating members 19 are interposed.

By deforming the insulating members 19 on the opening portions 15b side of the slots 15a such that both end portions thereof follow the curves of the end portions of the teeth 51, the straight portions 30b are covered from both sides and do not protrude radially inwards from the inner circumferential surface of the inner circumferential core portion 73.

Figure 19:
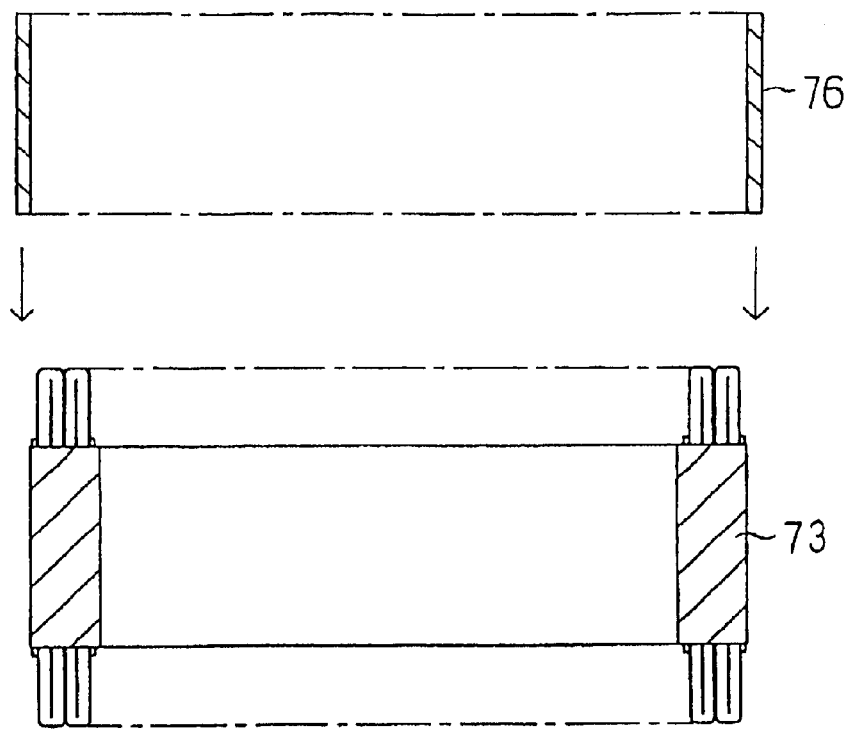
FIG. 19 is a diagram showing an outer circumferential core portion being fitted over an inner circumferential core portion.
Figure 20:
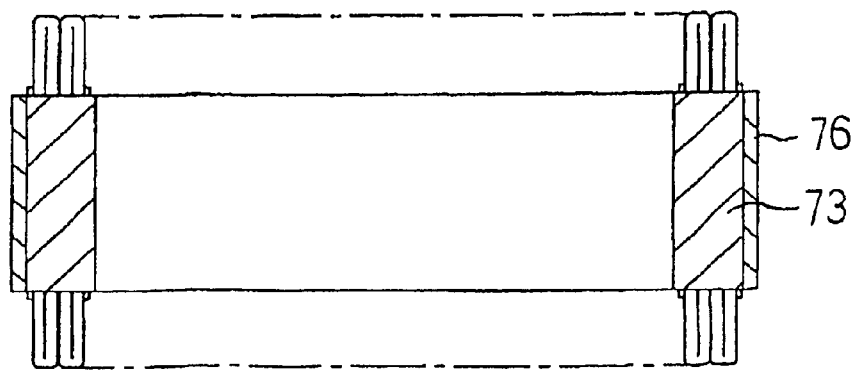
FIG. 20 is a cross section of the stator after the outer circumferential core portion has been fitted over the inner circumferential core portion.

The rigidity of the stator core 15 is increased by forming the inner circumferential core portion 73 and then press fitting the inner circumferential core portion 73 into the outer circumferential core portion 76 as shown in FIGS. 19 and 20. In this case, before the inner circumferential core portion 73 is inserted into the outer circumferential core portion 76, outside diameter dimensions of the inner circumferential core portion 73 are slightly larger than inside diameter dimensions of the outer circumferential core portion 76 (at this point there is an air gap in the abutting portion 77) so that the shape of the inner circumferential core portion 73 is restricted by the outer circumferential core portion 76 during press fitting of the outer circumferential core portion 76, enabling the roundness of the inner circumferential core portion 73 to be increased.

Thereafter, the manufacturing of the stator 8 is completed by connecting the end portions of the strands of wire 30 to form the stator winding portions 161 based on the connections shown in FIG. 3.

In the above automotive alternator, because the first to fourth winding sub-portions 31 to 34 constituting the polyphase stator winding 16 are each composed of one strand of wire 30 (continuous wire), it is not necessary to insert a large number of short conductor segments 305 into the stator core 301 and join end portions 305b to each other by welding, soldering, etc., as was required in the conventional stator 300, enabling the productivity of the stator 8 to be improved significantly.

The operation of assembling the stator winding 70 is greatly improved compared to the conventional art, in which a large number of conductor segments 305 are inserted into the slots one at a time, by rolling the parallelepiped base core 36 into a cylindrical shape with the straight portions 30b of the two wire-strand groups 35A and 35B housed in the slots 36a of the base core 36, and abutting the ends of the base core 36 and welding them to each other. In particular, because the strand-wire groups are wound so as to alternately occupy inner and outer layers in a slot depth direction in every sixth slot, turn portions of the coil ends are arranged neatly in rows so as not to interfere with each other, eliminating interference and short-circuiting between the strands of wire even when the parallelepiped base core is rolled up into the cylindrical shape, deformation of the strands of wire in the slots is reduced, and insulation and assembly are improved by the sliding and buffering effects of the insulating paper interposed between the strands of wire and the core.

Furthermore, the following effects on the performance of the alternator are also achieved.

Because the coil ends are constituted by the turn portions 30a of the strands of wire 30, the only joints in the coil end groups 16a and 16b are the first and second end portions of the first to fourth winding sub-portions 31 to 34 and the bridging connection joint portions, significantly reducing the number of joints. Thus, because the occurrence of short-circuiting accidents which accompany loss of insulation due to the joining process can be suppressed, superior insulation can be achieved. Furthermore, the conductors are not softened by welding, raising the rigidity of the stator as a whole and enabling magnetic noise to be reduced.

The coil end groups 16a and 16b are constructed by arranging the turn portions 30a neatly in rows circumferentially so as not to interfere with each other. Thus, compared to the conventional coil end groups in which the end portions 305b of the conductor segments 305 were joined to each other, the height to which the coil end groups extend outwards from the stator core 15 can be reduced. Thus, wind resistance in the coil end groups 16a and 16b is reduced, enabling the reduction of wind noise due to the rotation of the rotor 7. Leakage reactance from the strands of wire in the coil ends is also reduced, improving output and efficiency.

Four strands of wire 30 are arranged so as to line up in a row radially within each slot 15a, and the turn portions 30a are arranged to line up in two rows circumferentially. Thus, the turn portions 30a constituting the coil end groups 16a and 16b are each divided into two rows radially, enabling the height to which the coil end groups 16a and 16b extend outwards from the stator core 15 to be reduced. As a result, wind resistance in the coil end groups 16a and 16b is reduced, enabling the reduction of wind noise due to the rotation of the rotor 7.

Because the straight portions 30b of the strands of wire 30 are formed with a rectangular cross section, the cross-sectional shape of the straight portions 30b fits neatly into the shape of the slots 15a when the straight portions 30b are housed inside the slots 15a. Thus, the insertion of the polyphase stator winding 16 into the stator core 15 is improved and the space factor of the strands of wire 30 inside the slots 15a is easily increased, enabling improved transfer of heat from the strands of wire 30 to the stator core 15.

Embodiment 2

FIG. 21 shows Embodiment 2 of the present invention. Embodiment 2 differs from Embodiment 1 in that the insulating members 19, which are composed of insulating paper, are wound completely around the straight portions 30b of the two wire-strand groups 35A and 35B before the wire-strand groups 35A and 35B are inserted into the base core. Thus, it is not necessary to install the insulating members in the slots separately.

Embodiment 3

Figure 23A:
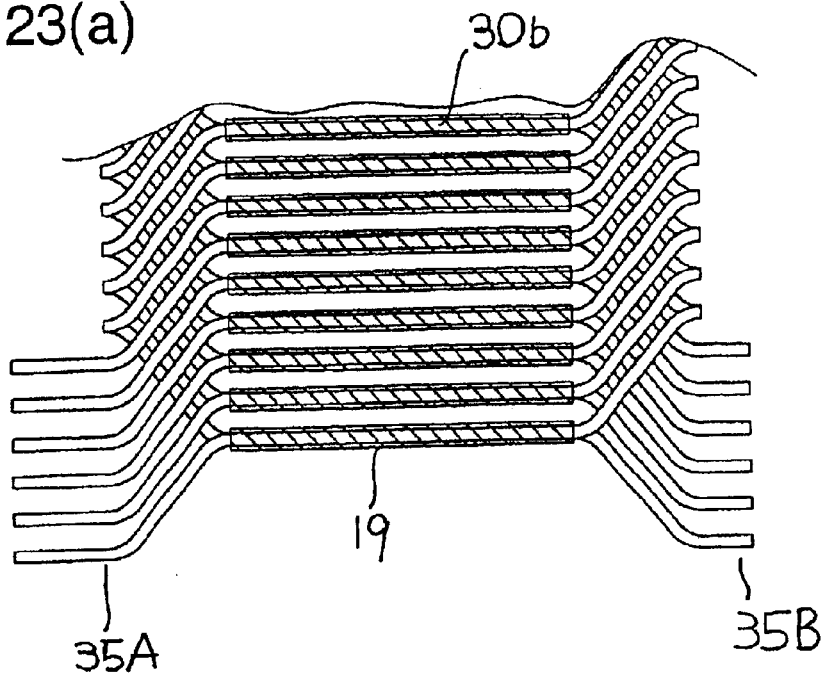
FIG. 23 (a) is a partial plan of the winding in Embodiment 3.
Figure 23B:
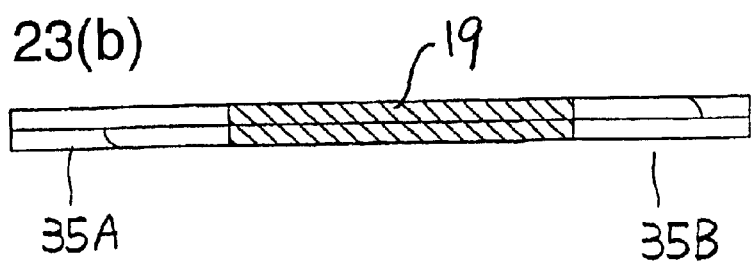

FIGS. 22 and 23 show Embodiment 3 of the present invention. Embodiment 3 differs from Embodiments 1 and 2 in that the straight portions 30b of the two wire-strand groups 35A and 35B are completely covered by the insulating members 19, which are composed of polyamide resin, before the wire-strand groups 35A and 35B are inserted into the base core. Thus, it is not necessary to install the insulating members in the slots separately, and because the wire-strand groups are secured by resin molding and held together, the winding is easy to handle. Because the straight portions 30b are formed in resin, they can easily be shaped to match the shape of the slots, enabling the space factor of the conductors in the slots to be improved as well. In particular, when insulating paper is used for the insulating members, it is necessary to overlap end portions thereof, etc., but in the case of the present embodiment, this is not necessary.

Embodiment 4

Figures 24A, 24B, 24C, 24D, 24E:
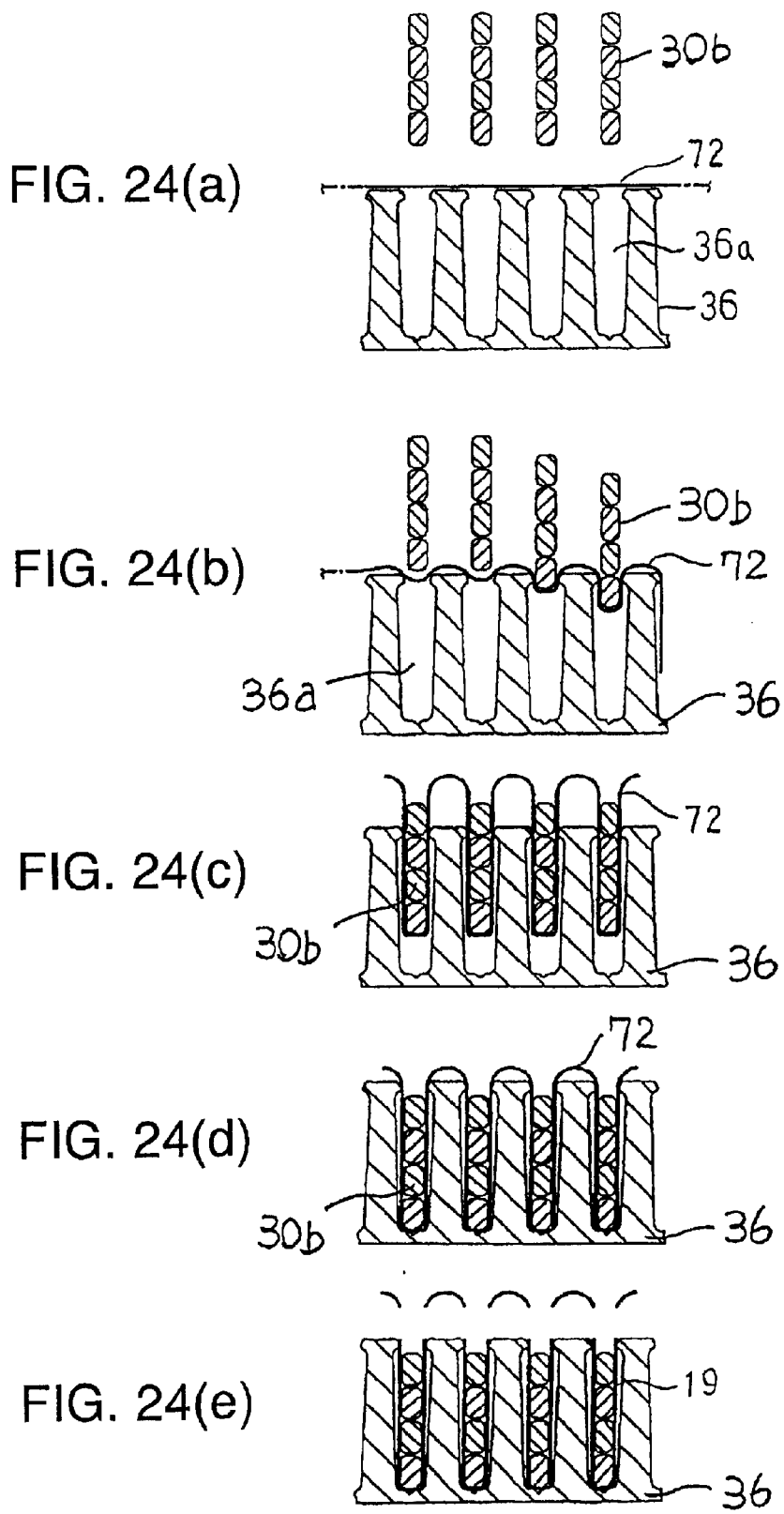
FIGS. 24 (a) to (e) are diagrams showing steps of inserting a winding into a base core in Embodiment 4.
Figure 25A:
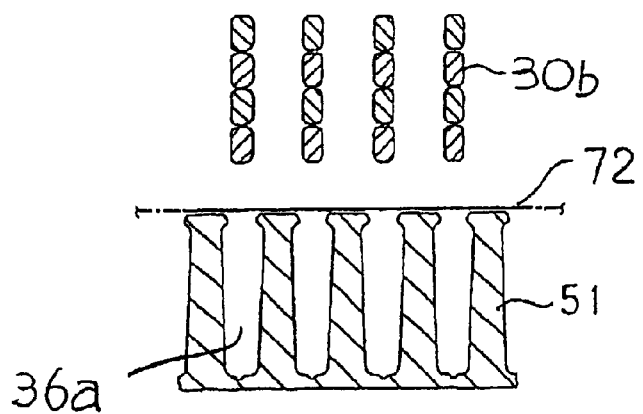
FIGS. 25 (a) to (e) are diagrams showing steps of inserting a winding into a base core in Embodiment 5.
Figure 25B:
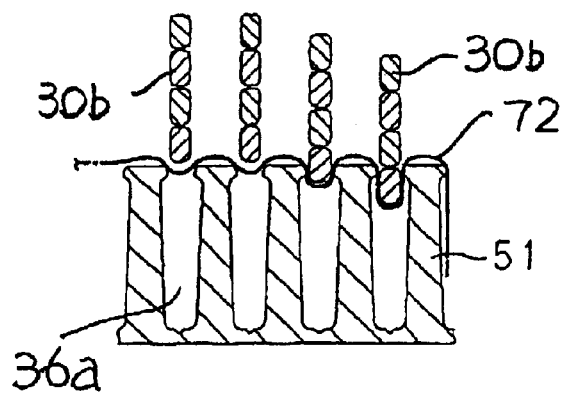
Figure 25C:
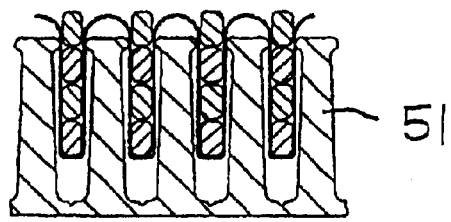
Figure 25D:
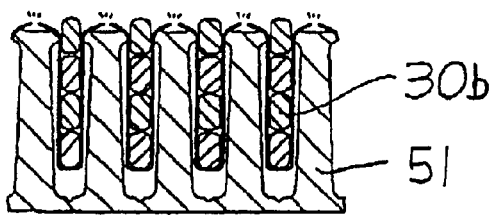
Figure 25E:
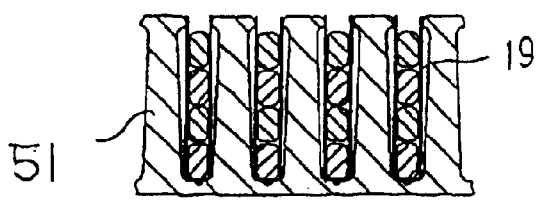

FIGS. 24 (a) and (b) show Embodiment 4 of the present invention. In Embodiment 4, a strip of base insulating members 72 is placed on top of the slots 36a of the base core 36, and then the straight portions 30b of the two wire-strand groups 35A and 35B are inserted into each of the slots 36a through the base insulating members 72. Because the wire-strand groups 35A and 35B slide together with the base insulating members 72 as they are inserted in to the base core 36, damage to the strands of wire 30 due to contact between the strands of wire 30 and the base core 36 is prevented, improving the assembly of the stator 8. Moreover, the insulating members 19 are formed by removing portions of the base insulating members 72 projecting inwards from a radially inner surface of the stator core 15 in one step.

Embodiment 5

FIGS. 25 (*a*) and (*b*) show Embodiment 5 of the present invention. In Embodiment 5, the straight portions 30*b* of the two wire-strand groups 35A and 35B are inserted into each of the slots 36*a* through the base insulating members 72 and portions of the base insulating members 72 projecting inwards from the radially inner surface of the stator core 15 are removed before floor portions of the slots are reached. In this manner, there are no portions of the base insulating members 72 protruding inwards from the radially inner surface of the stator core 15 by the time insertion is completed, improving workability, and the material yield of the insulating members is improved. Moreover, perforations may also be disposed in the base insulating members 72 at predetermined lengths. By providing these perforations, the base insulating members 72 are divided by the force of insertion against the teeth 51 on both sides after the straight portions 30*b* have been inserted into the slots by a certain degree to obtain the insulating members 19.

Embodiment 6

Figure 27A:
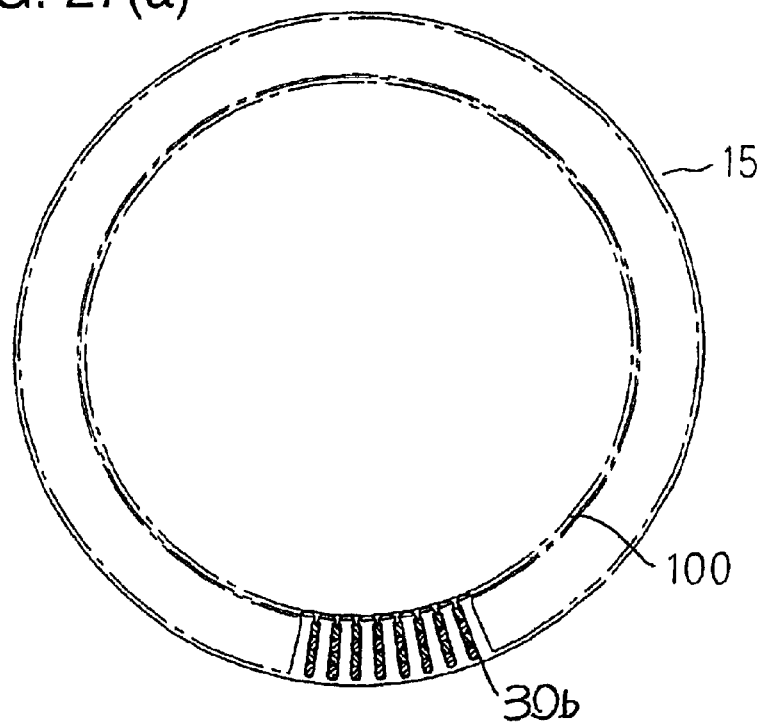
FIGS. 27 (a) and (b) are diagrams showing steps of dividing base insulator members on an inner circumferential surface of a stator core in Embodiment 6.
Figure 27B:
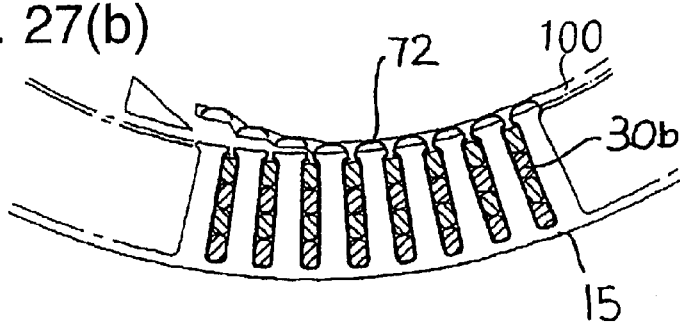

FIGS. 27 (*a*) and (*b*) show Embodiment 6 of the present invention. In Embodiment 6, because the base insulating members 72, which are composed of insulating paper, are divided at the same time as inner circumferential dimension processing of the stator core 15, there is no need for processing while the base core 36 is still parallelepiped. Furthermore, by fixing the base insulating members 72 to the inner circumferential surface of the stator core 15 using a resin 100 such as varnish, accuracy and ease of the dividing operation can be improved. Moreover, securing of the base insulating members to the inner circumferential surface of the stator core 15 can be made even more reliable by forming a number of openings in the base insulating members.

Embodiment 7

Figure 28A:
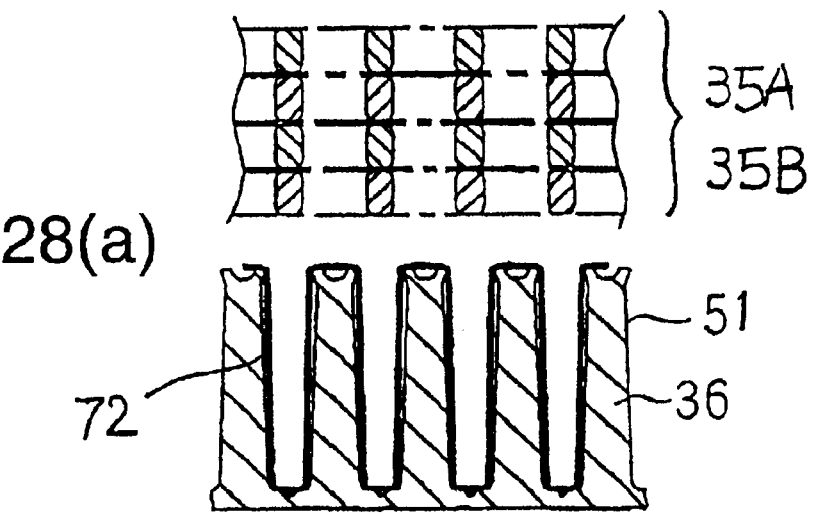
FIGS. 28 (a) and (b) are diagrams showing plastic deformation of end portions of teeth after insertion of a winding into a base core in Embodiment 7.
Figure 28B:
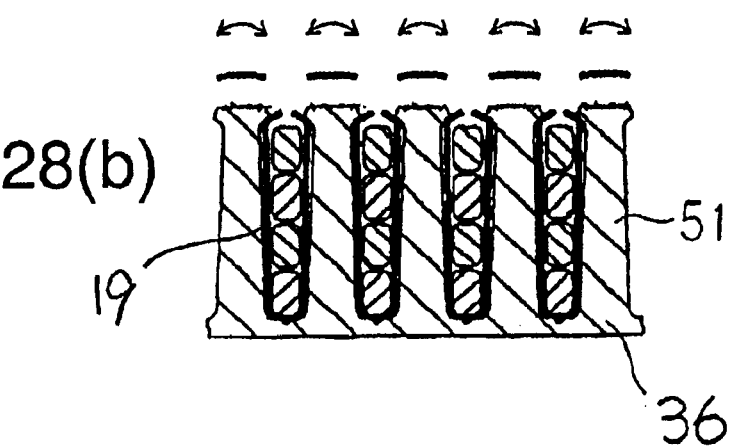
Figure 29:
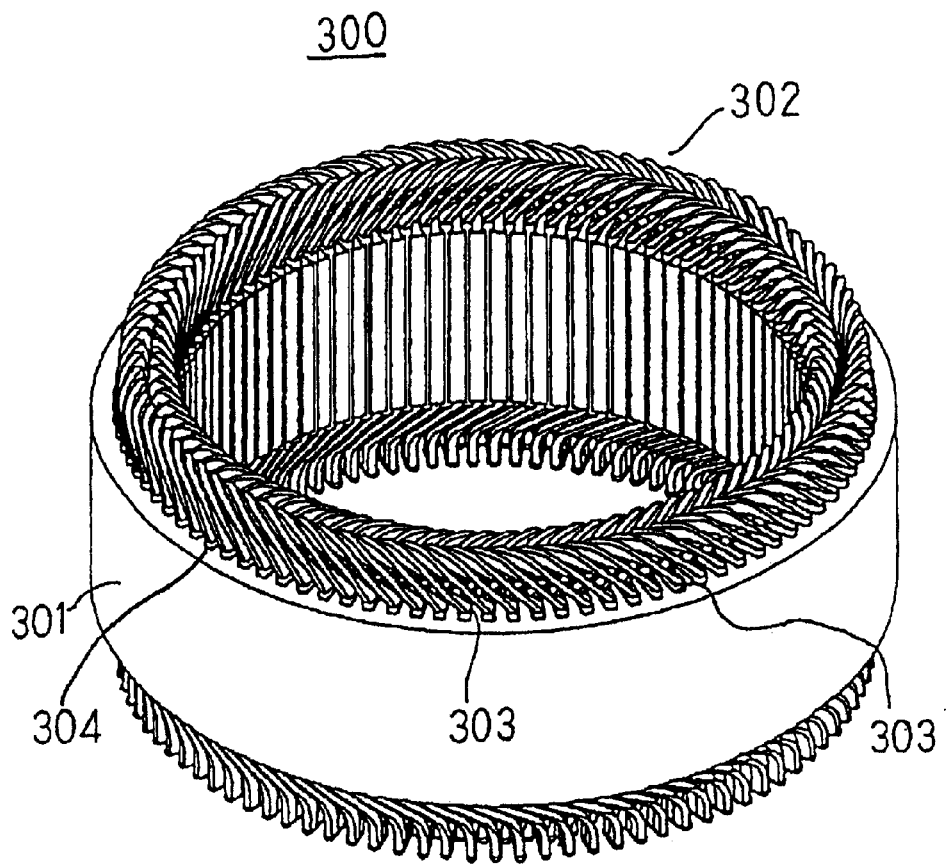
FIG. 29 is a perspective of a stator of a conventional automotive alternator.
Figure 30:
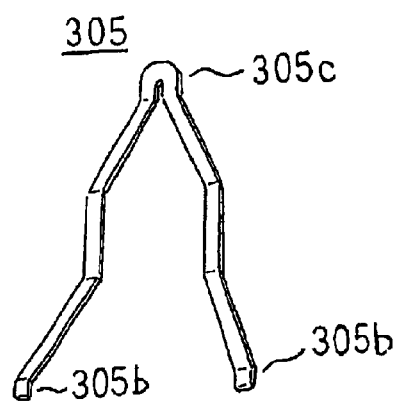
FIG. 30 is a perspective showing a conductor segment used in the stator in FIG. 29.
Figure 31:
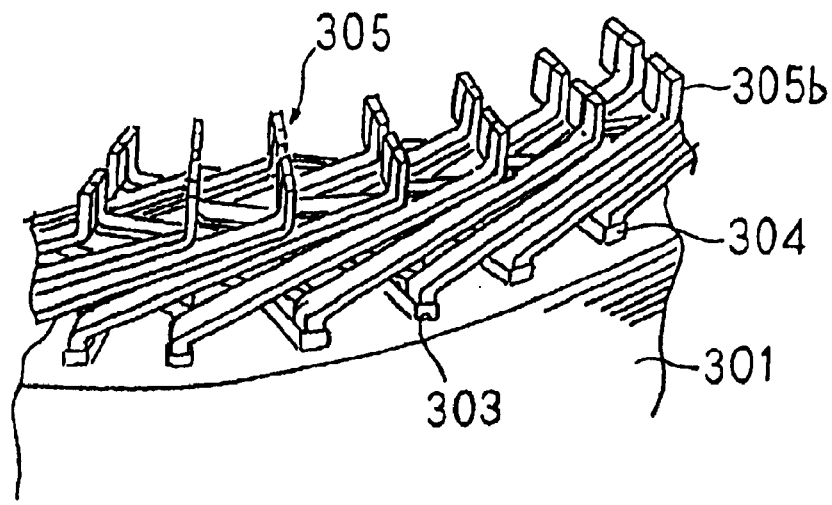
FIG. 31 is a perspective from a front end of part of the stator in FIG. 29.
Figure 32:
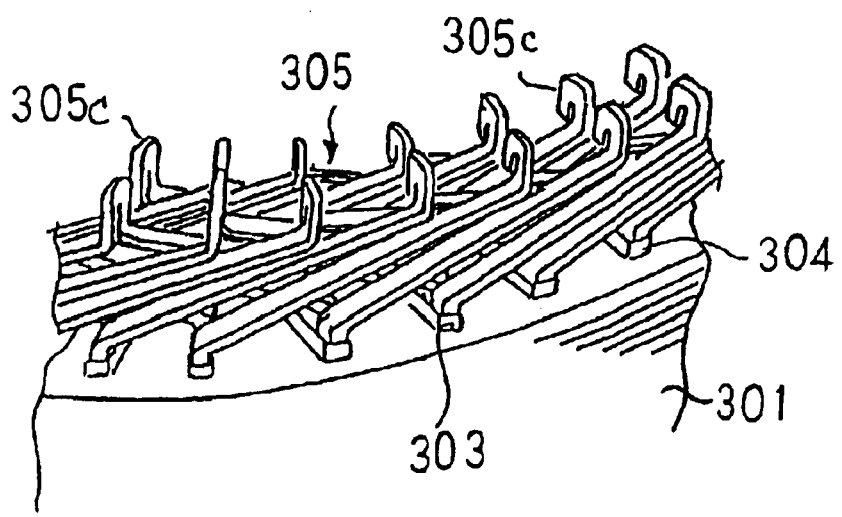
FIG. 32 is a perspective from a rear end of part of the stator in FIG. 29.
Figure 33:
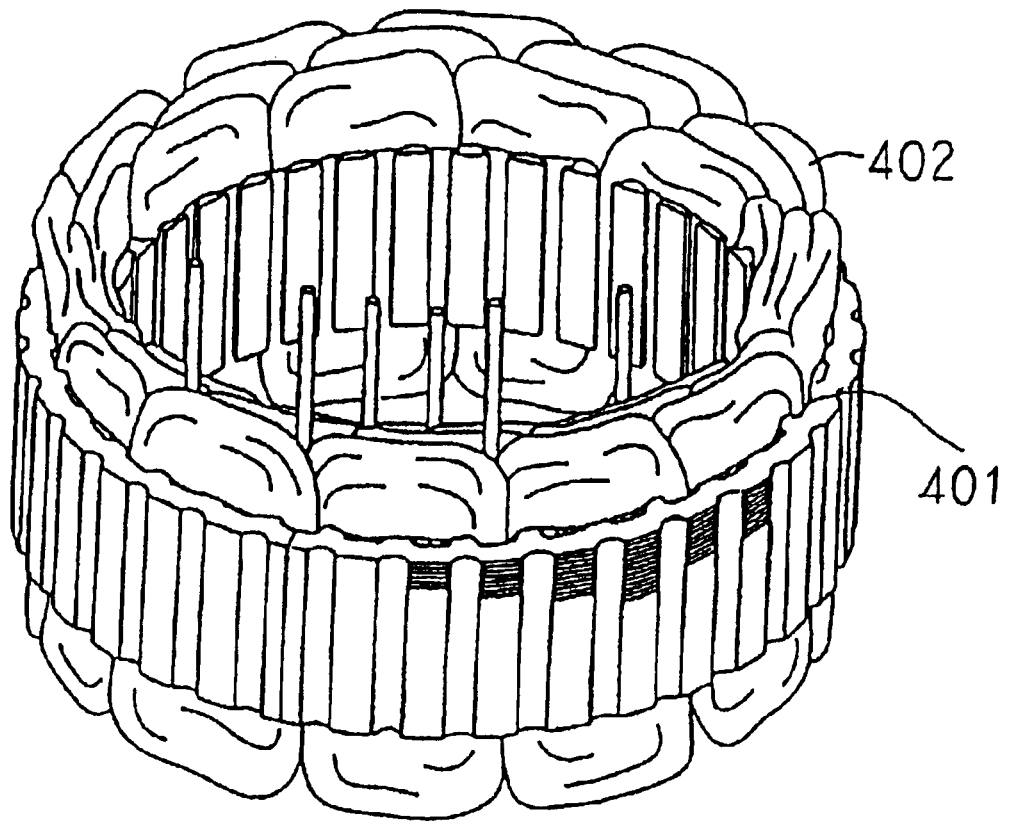
FIG. 33 is a perspective showing another example of a stator of a conventional automotive alternator.

FIGS. 28 (*a*) and (*b*) show Embodiment 7 of the present invention. In Embodiment 7, end portions of the teeth 51 defining the slots 36*a* of the base core 36 are pressed and plastically deformed after integration of the base core 36 and the wire-strand groups 35A and 35B, thereby dividing the base insulating members 72 and forming the insulating members 19 as the width dimensions of the opening portions 36*b* of the slots 36 are being reduced. Thus a separate step of dividing the base insulating members 72 can be omitted.

Figure 26:
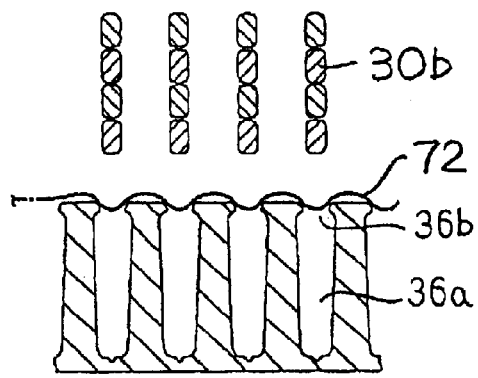
FIG. 26 is a variation on insertion of the winding into the base core.

In each of the above embodiments, the straight portions 30*b* can be more easily positioned relative to the opening portions 36*b* of the slots 36*a* by forming peaks and valleys in the base insulating members 72 in a longitudinal direction, as shown in FIG. 26.

As explained above, an alternator according to one aspect of the present invention comprises: a rotor for forming north-seeking (N) and south-seeking (S) poles alternately about a rotational circumference; and a stator comprising: a stator core surrounding the rotor; and a polyphase stator winding installed in the stator core, the stator core being formed with a number of slots extending axially at a predetermined pitch in a circumferential direction and being provided with an abutting portion extending axially, the abutting portion making the stator core into an annular shape by abutting end portions of the stator core, the polyphase stator winding comprising a number of winding portions in which long strands of wire are wound so as to alternately occupy an inner layer and an outer layer in a slot depth direction within the slots at intervals of a predetermined number of slots, the strands of wire folding back outside the slots at axial end surfaces of the stator core, and an insulating member being interposed between the stator core and the winding. Therefore, the turn portions of the coil ends are lined up neatly in rows circumferentially so as not to interfere with each other, preventing damage to the strands of wire due to interference and short circuiting between the strands of wire during bending of the base core. Furthermore, deformation of the strands of wire in the slots is reduced, and insulation and assembly are improved by the sliding and buffering effects of the insulating members interposed between the strands of wire and the core. Damage is suppressed and insertion is smoothed by the insulating members during insertion of the strands of wire into the slots, improving the insertion operation.

According to anther aspect of the present invention, insulating member is first disposed on the winding before the winding is inserted into the slots of the stator core. Therefore, there is no need to install the insulating members in the slots in advance, improving operations.

According to still anther aspect of the present invention, the insulating member is first disposed on the winding before the winding is inserted into the slots of the stator core. Therefore, insertion is smoothed by the insulating members during insertion of the strands of wire into the slots, improving the insertion operation. Furthermore, there is no need to provide a separate step of installing the insulating members into the slots.

According to one form of the method for manufacturing the alternator, a straight base insulating member may be first disposed between the slots and the winding; the base insulating member is interposed between the stator core and the winding by inserting the winding into the slots; and the insulating member is later formed by dividing the base insulating member between the slots. Therefore, there is no need to dispose insulating members individually in every slot, improving the stator assembly operation.

According to another form of the method for manufacturing the alternator, a straight base insulating member may be first disposed between the slots and the winding; and the insulating member may be formed by dividing the base insulating member between the slots as the winding is being inserted into the slots and the base insulating member is being interposed between the stator core and the winding. Therefore, the yield of the insulating members is improved. Furthermore, there are no portions of the insulating members protruding inwards from the radially inner surface of the stator core, eliminating the step of removing such portions.

According to another still form of the method for manufacturing the alternator, a straight base insulating member may be first disposed between the slots and the winding; the base insulating member may be interposed between the stator core and the winding by inserting the winding into the slots; and the insulating member may be later formed by dividing the base insulating member between the slots together with inner circumferential dimension processing of the stator core. Therefore, there is no need to provide a separate dividing step for dividing the insulating members.

According to one form of the method for manufacturing the alternator, a straight base insulating member may be first disposed between the slots and the winding; the base insulating member may be interposed between the stator core and the winding by inserting the winding into the slots; and the insulating member may be later formed by dividing the base insulating member between the slots after securing the base insulating member with resin. Therefore, dividing of the insulating members is facilitated.

According to another form of the method for manufacturing the alternator, the insulating member may be formed by dividing the base insulating member between the slots when end portions of teeth defining the slots may be being pressed and plastically deformed. Therefore, there is no need to provide a separate step of dividing the insulating members.

According to still another form of the method for manufacturing the alternator, the insulating member may be composed of insulating paper. Therefore, the insulating members deform easily but do not tear easily.

According to one form of the method for manufacturing the alternator, the insulating member may be composed of a resin. Therefore, the wire-strand groups can be molded, fastened, and held together by resin, making them easy to handle. Furthermore, the insulating members can be shaped to match the shape of the slots, improving the space factor of the conductors in the slots.

What is claimed is:

1. In an alternator having:
   a rotor for forming north-seeking (N) and south-seeking (S) poles alternately about a rotational circumference, and
   a stator having:
      a stator core surrounding said rotor, and
      a polyphase stator winding installed in said stator core,
   said stator core being formed with a number of slots extending axially at a predetermined pitch in a circumferential direction and being provided with an abutting portion extending axially, said abutting portion making said stator core into an annular shape by abutting end portions of said stator core,
   said polyphase stator winding comprising a number of winding portions in which long strands of wire are wound so as to alternately occupy an inner layer and an outer layer in a slot depth direction within said slots at intervals of a predetermined number of slots, said strands of wire folding back outside said slots at axial end surfaces of said stator core, and
   an insulating member being interposed between said stator core and said winding;
   a method for manufacturing the alternator wherein said insulating member is first disposed on said winding before said winding is inserted into said slots of said stator core.

2. The method for manufacturing the alternator according to claim 1 wherein:
   a base insulating member is first disposed between said slots and said winding; and
   said insulating member is interposed between said stator core and said winding by inserting said winding into said slots.

3. The method according to claim 2 for manufacturing the alternator wherein:
   a straight base insulating member is first disposed between said slots and said winding;
   said base insulating member is interposed between said stator core and said winding by inserting said winding into said slots; and
   said insulating member is later formed by dividing said base insulating member between said slots.

4. The method according to claim 2 for manufacturing the alternator wherein:
   a straight base insulating member is first disposed between said slots and said winding; and
   said insulating member is formed by dividing said base insulating member between said slots as said winding is being inserted into said slots and said base insulating member is being interposed between said stator core and said winding.

5. The method according to claim 2 for manufacturing the alternator wherein:
   a straight base insulating member is first disposed between said slots and said winding;
   said base insulating member is interposed between said stator core and said winding by inserting said winding into said slots; and
   said insulating member is later formed by dividing said base insulating member between said slots together with inner circumferential dimension processing of said stator core.

6. The method according to claim 2 for manufacturing the alternator wherein:
   a straight base insulating member is first disposed between said slots and said winding; inserting said winding into said slots; and
   said insulating member is later formed by dividing said base insulating member between said slots after securing said base insulating member with resin.

7. The method according to claim 2 for manufacturing the alternator wherein said insulating member is formed by dividing said base insulating member between said slots when end portions of teeth defining said slots are being pressed and plastically deformed.

8. The method according to claim 1 for manufacturing an alternator wherein said insulating member is composed of insulating paper.

9. The method according to claim 1 for manufacturing an alternator wherein said insulating member is composed of a resin.

* * * * *